United States Patent [19]

Wilson et al.

[11] Patent Number: 5,099,444

[45] Date of Patent: Mar. 24, 1992

[54] PERIPHERAL DATA ACQUISITION, TRANSMISSION AND CONTROL DEVICE

[75] Inventors: Dennis A. Wilson, Wauconda Township, Lake County; Mark S. Williamsen, Harwood Heights, both of Ill.

[73] Assignee: Ansan Industries, Ltd., Rockford, Ill.; a part interest

[21] Appl. No.: 350,115

[22] Filed: May 9, 1989

[51] Int. Cl.$^5$ .............................. G06F 3/00
[52] U.S. Cl. .............................. 364/709.09
[58] Field of Search ............ 364/709.01, 709.09, 364/709.11, 709.12, 708, 709.02–709.08, 709.1

[56] References Cited

U.S. PATENT DOCUMENTS

| | | | |
|---|---|---|---|
| 3,654,449 | 4/1972 | Boyce | 364/709.11 |
| 3,955,073 | 5/1976 | Carew et al. | 364/561 |
| 4,084,249 | 4/1978 | Schlick | 364/709.01 |
| 4,101,883 | 7/1978 | Hempenius et al. | 341/22 |
| 4,151,596 | 4/1979 | Howells | 364/709.11 |
| 4,181,959 | 1/1980 | Tateishi | 364/709.11 |
| 4,181,960 | 1/1980 | Tateishi et al. | 364/709.11 |
| 4,195,348 | 3/1980 | Kakutani | 364/709.11 |
| 4,201,908 | 5/1980 | Johnson et al. | 377/9 |
| 4,213,035 | 7/1980 | Washizuka et al. | 364/709.12 |
| 4,250,554 | 2/1981 | Blum et al. | 364/560 |
| 4,370,727 | 1/1983 | Bellet | 364/709.13 |
| 4,379,336 | 4/1983 | Yamamoto et al. | 364/708 |
| 4,480,312 | 10/1984 | Wingate | 364/557 |
| 4,621,334 | 11/1986 | Garcia | 364/550 |
| 4,669,053 | 5/1987 | Krenz | 364/708 |
| 4,695,833 | 9/1987 | Ogura et al. | 340/722 |
| 4,704,604 | 11/1987 | Fuhs | 364/708 |
| 4,710,869 | 12/1987 | Enokizono | 364/709.09 |
| 4,782,448 | 11/1988 | Milstein | 364/709.11 |
| 4,821,221 | 4/1989 | Kaneko | 364/710.13 |
| 4,831,568 | 5/1989 | Ito | 364/709.01 |
| 4,852,032 | 7/1989 | Matsuda et al. | 364/708 |
| 4,882,684 | 11/1989 | Ishigami et al. | 364/708 |
| 4,885,580 | 12/1989 | Noto et al. | 364/709.01 |
| 4,935,875 | 6/1990 | Shah et al. | 364/709.01 |

FOREIGN PATENT DOCUMENTS 2125996  3/1984  United Kingdom .......... 364/709.11

OTHER PUBLICATIONS

Ernst, "Remotely Control a Pocket Calculator with a Simple CMOS Interface Circuit", *Electronic Design*, vol. 23, pp. 74–75, Nov. 8, 1976.

Primary Examiner—Dale M. Shaw
Attorney, Agent, or Firm—Kajane McManus; Mathew Perrone

[57] ABSTRACT

The peripheral data acquisition, transmission and control device provides means for inputting information into a computer without having to type the same therein or to receive information from a computer in order to guide various functions, such as manufacturing functions.

72 Claims, 25 Drawing Sheets

250 PULSE WIDTH CONVERSION CIRCUIT

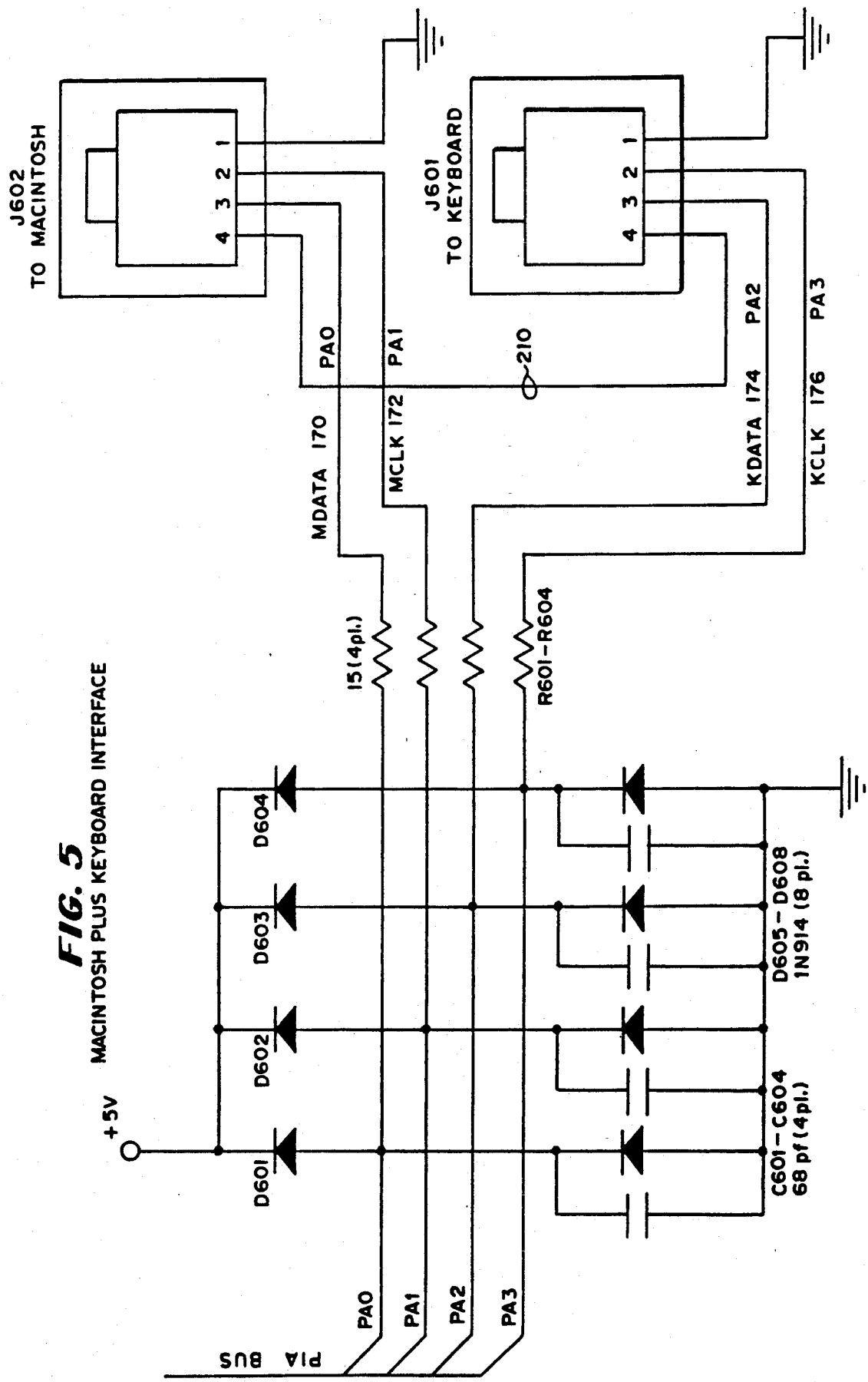
FIG. 5 MACINTOSH PLUS KEYBOARD INTERFACE

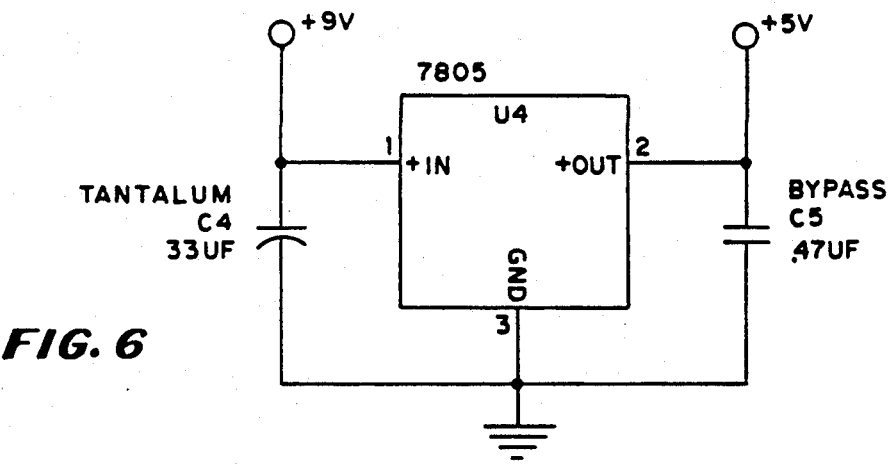
*FIG. 6*
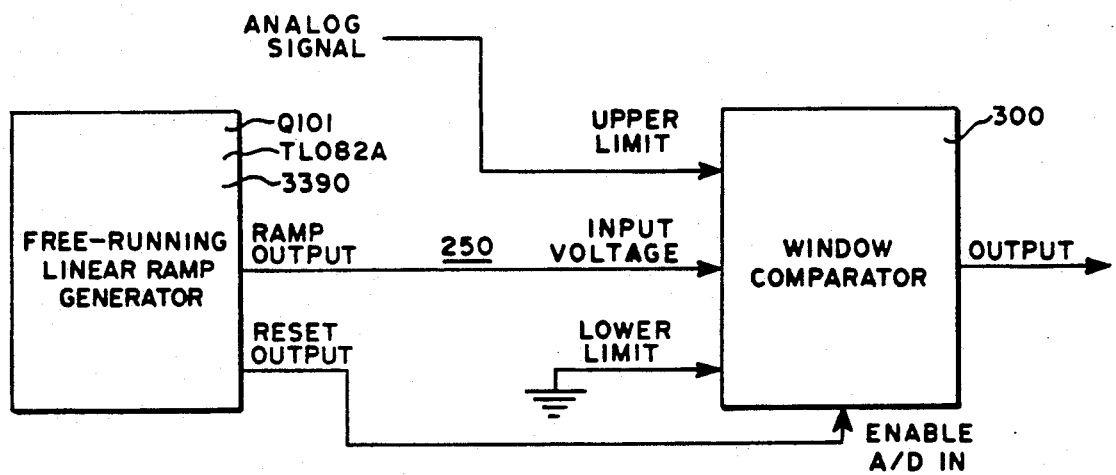
*FIG. 7*
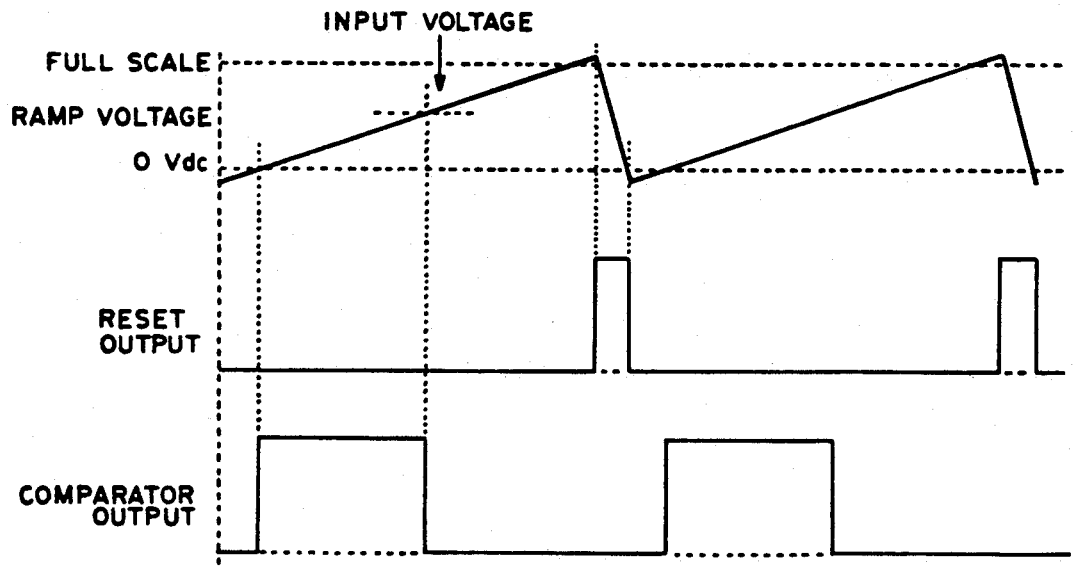
*FIG. 8* SINGLE SLOPE ANALOG TO PULSE WIDTH CONVERTER TIMING DIAGRAM

DESK TOP BUS INTERFACE

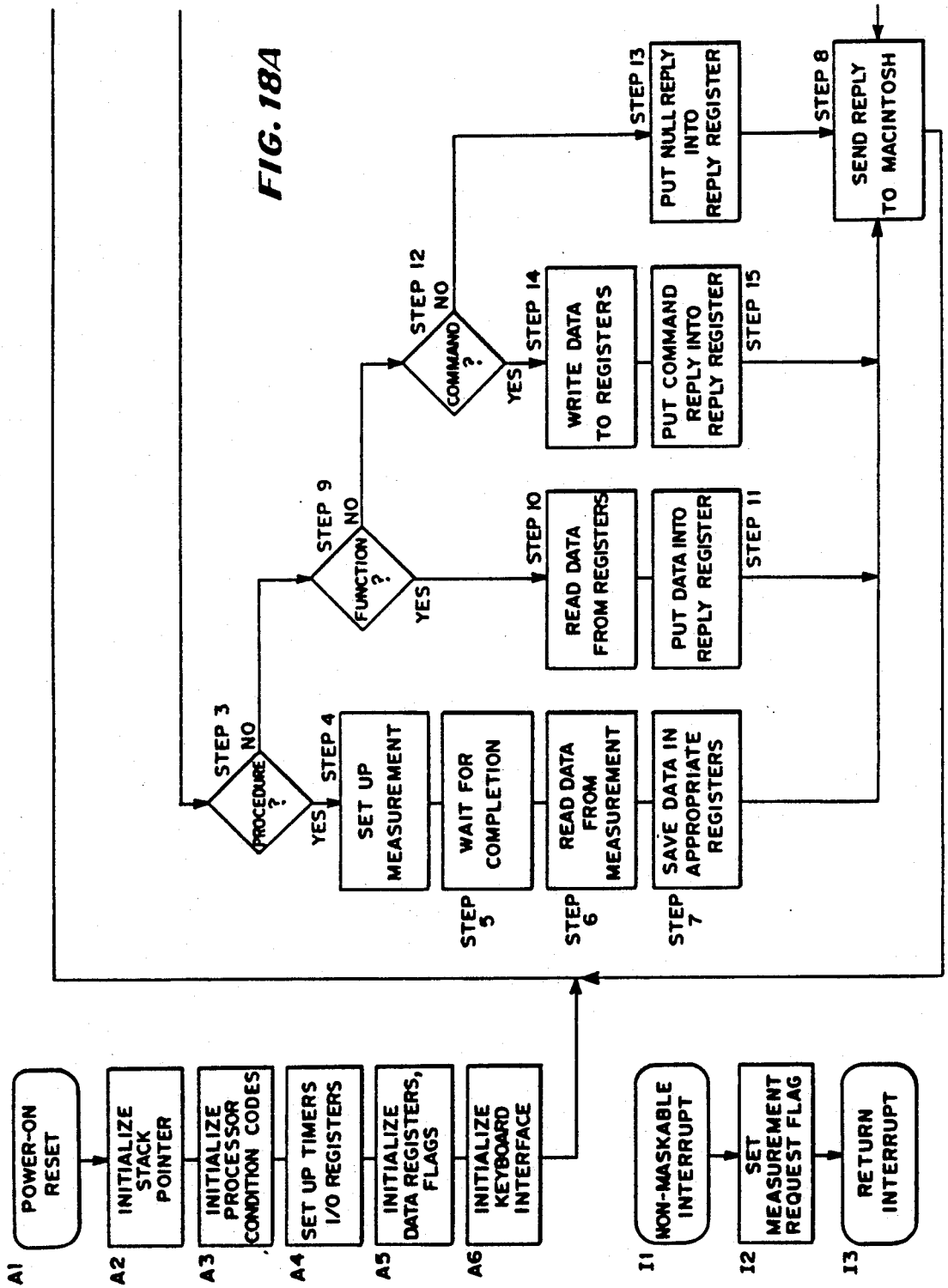

FIG. 20

| DB-25 PIN | FUNCTION | 24 PIN DIP |
|---|---|---|
| | I/O BRIDGE REAR PANEL DB-25 PINOUTS: | |
| 1 | CHASSIS GROUND | 24 |
| 2 | SERIAL XMIT | 23 |
| 3 | SERIAL RCV | 22 |
| 4 | PA7 (-RCV) | 21 |
| 5 | A/D INHIBIT (GROUND IT) | 20 |
| 6 | +8 Vdc (FILTERED) | 19 |
| 7 | DIGITAL GROUND | 18 |
| 8 | PA5 (PWM OUTPUT) | 17 |
| 9 | PA4 (TACHOMETER INPUT) | 16 |
| 10 | OUT 1 | 15 |
| 11 | OUT 2 | 14 |
| 12 | OUT 3 | 13 |
| 13 | OUT 4 | N/C |
| 14 | OUT 5 | 1 |
| 15 | OUT 6 | 2 |
| 16 | OUT 7 | 3 |
| 17 | OUT 8 | 4 |
| 18 | IN 1 | 5 |
| 19 | IN 2 | 6 |
| 20 | IN 3 | 7 |
| 21 | IN 4 | 8 |
| 22 | IN 5 | 9 |
| 23 | IN 6 | 10 |
| 24 | IN 7 | 11 |
| 25 | IN 8 | 12 |

REPETITION RATE TO PULSE WIDTH CIRCUIT

EVENT COUNTER INPUT CONDITIONER

DIGITAL INTERFACE MULTIPLEXER

DIGITAL INTERFACE MULTIPLEXER

REPETITION RATE TO PULSE WIDTH TIMING

PERIPHERAL DATA ACQUISITION, TRANSMISSION AND CONTROL DEVICE

FIELD OF THE INVENTION

The present invention relates to a peripheral data acquisition, transmission and control device for use with a computer having a detachable keyboard, the output from the device emulating, in every respect, the signals transmitted to the computer during the operation of inputting values via the keyboard.

More specifically, the device includes programmable circuitry which allows data supplied thereto and fed therethrough, such as measurement data, to be entered directly into programs designed for keyboard entry only, with no keyboard entry being made and with no reprogramming of the computer, to which the data is being fed, being necessary.

DESCRIPTION OF THE PRIOR ART

Heretofore it has been proposed to provide computer controlled data acquisition systems which are designed to automate every step in a particular process.

An example of such an automated process would be a production sorting system where products are tested under computer control to see if the products are within limits for certain parameters and if they are not, they are "rejected" by the computer. Such a system tends to be expensive, bulky and of limited utility, outside of the narrow use for which it was designed.

There has also been a trend to develop data acquisition accessories for use with desktop computers, which have become very popular. Such accessories (either proposed or developed) consist of plug-in circuit cards which are connectable to the computer's central processor (CPU) and are dependent upon the computer as a power source therefor. Special programs must be written to set up the circuit card to take a particular measurement and read same to the central processor (CPU) so the reading either can be saved on a disc storage unit or displayed on a video monitor.

While such method reduces the tedium associated with reading and recording measured values and the possibility of errors in such reading and recording, it still has a drawback; that of requiring specialized knowledge and the ability to program the central processor (CPU) and the data acquisition circuit card in order to perform the desired functions.

A further difficulty is encountered in that existing software programs for performing data reduction and analysis based on keyboard entry of data must be modified, or even rewritten, in order to accept input from the data acquisition circuit card.

With the advent of computers having a detachable keyboard including its own microcontroller and with the keyboard being connected to the central processor (CPU) by a simple cable incorporating a power supply line, a ground line for the keyboard, and a bidirectional data line therefor, it has become possible to develop a device which is connectable between the keyboard and the central processor (CPU) which can emulate keystrokes for inputting data.

As will be described in greater detail hereinafter, the peripheral data acquisition, transmission and control device of the present invention provides a means for acquisition of measurement data and transference of such data to a central processor (CPU) in a manner which, in every respect, emulates the operation of typing in values via a keyboard.

In other words, the bridge device allows measurement data being input thereto to be modified therein, as required, and then output therefrom, directly into programs designed for keyboard entry only in a manner which completely emulates such keyboard entry, without need of keyboard entry of such data and without the need of modifying or rewriting existing programs to accept such input.

SUMMARY OF THE INVENTION

The peripheral data acquisition, transmission and control device of the present invention simulates the signals produced by the keyboard of a tabulating or computing machine (or a terminal of such a machine) in such a manner that, when the device is connected to the keyboard circuit of the machine, (computer) the machine responds exactly as if keys were actually being typed upon. The device generates signals corresponding to specific items of data so that the data can be entered into the machine.

The device will be used to automate data entry procedures where a human operator takes hundreds or thousands of measurements, records them, and then types them on a keyboard for further reduction and analysis. The device will automatically make the same measurements, then generate keyboard signals identical to those which would have occurred if the human operator had typed the values. The process can therefore be automated with no change to the tabulating or computing equipment, or to the equipment's internal software or other operations.

BRIEF DESCRIPTION OF THE DRAWINGS

FIGS. 4a – 4d, and FIG. 5 and FIG. 6 comprise a detailed schematic diagram of the circuitry of the device, simply defined in the block diagram of FIG. 3.

FIG. 7 is a block diagram of a single slope analog to pulse width converter of the device.

FIG. 8 is a timing diagram for the single slope analog to pulse width converter of FIG. 5.

FIG. 20 is a chart setting forth the external connections available at the DB25 connector on the back panel of the device of FIG. 2.

DESCRIPTION OF THE PREFERRED EMBODIMENTS

Figure 1:
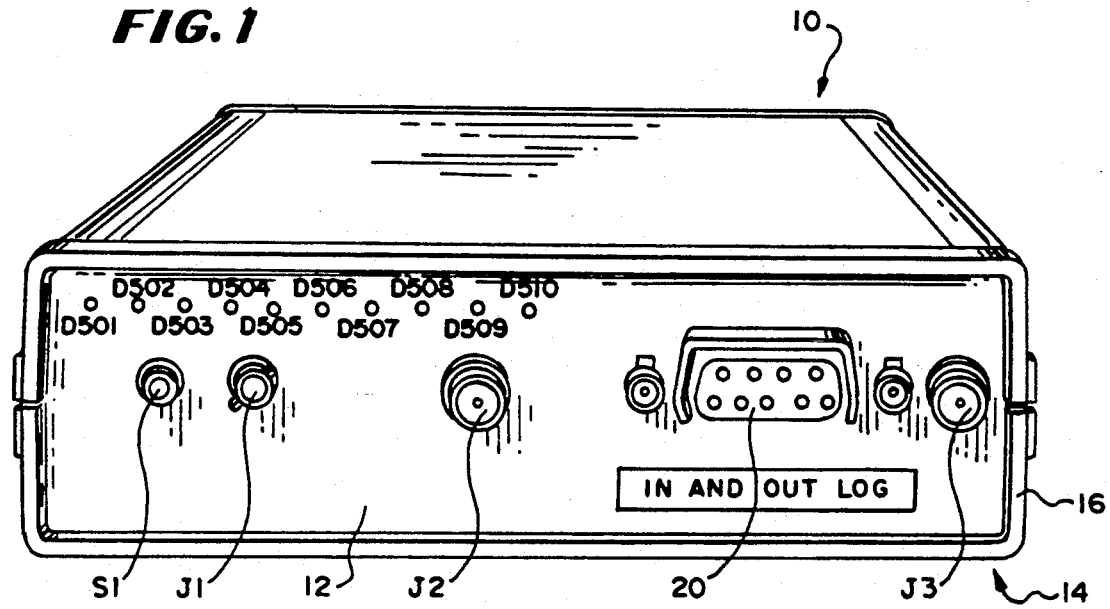
FIG. 1 is a perspective view of the data acquisition, transmission and control device of the present invention and shows a top panel and a front panel thereof.

Referring now to the drawings in greater detail FIG. 1 shows the peripheral data acquisition, transmission and control device device 10 of the present invention in a perspective view which illustrates the components found on a front panel 12 of the device 10, as well as showing that the housing 14 for the device 10 is in the form of a box 16.

Figure 4A:
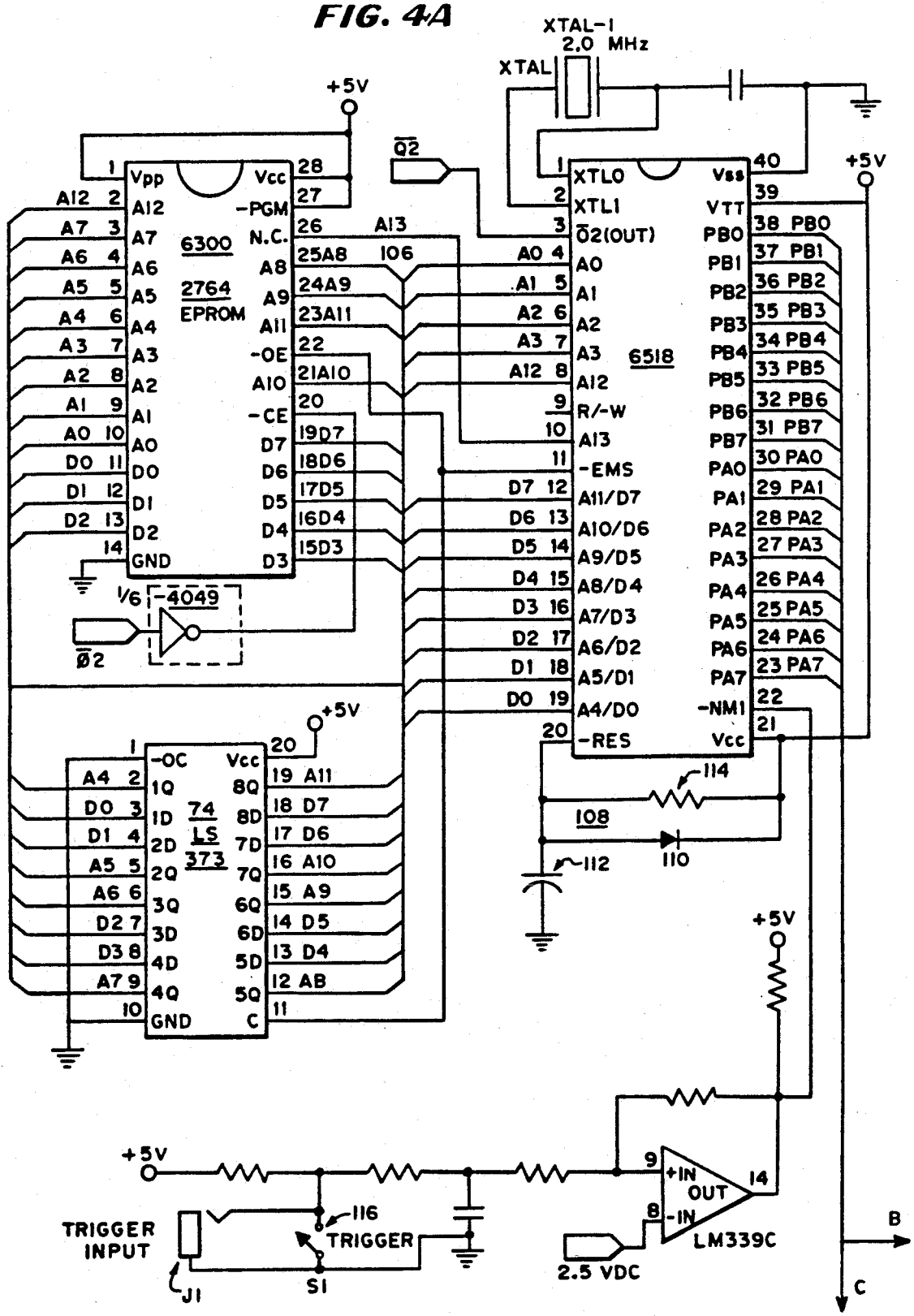
Figure 4B:
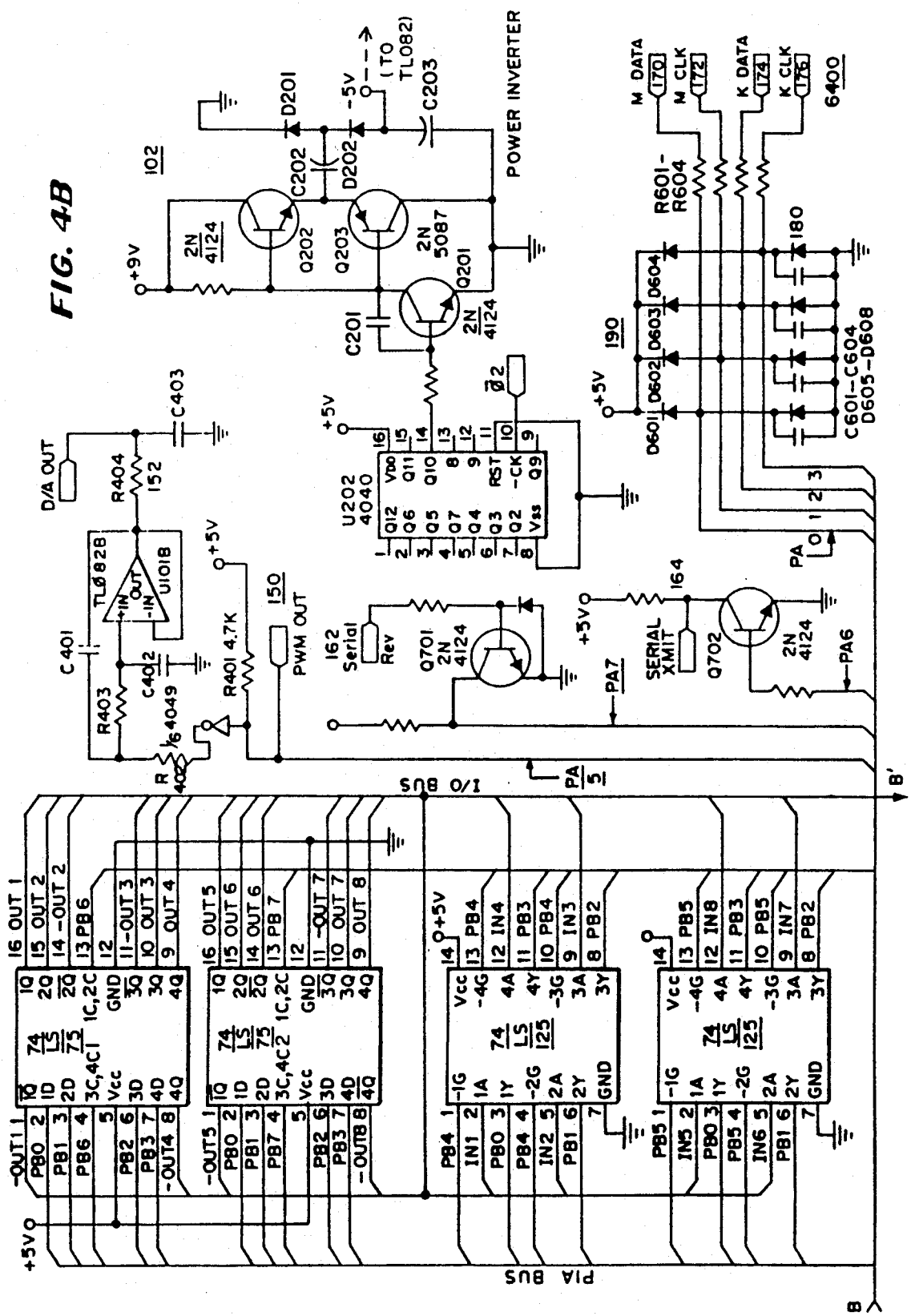
Figure 4C:
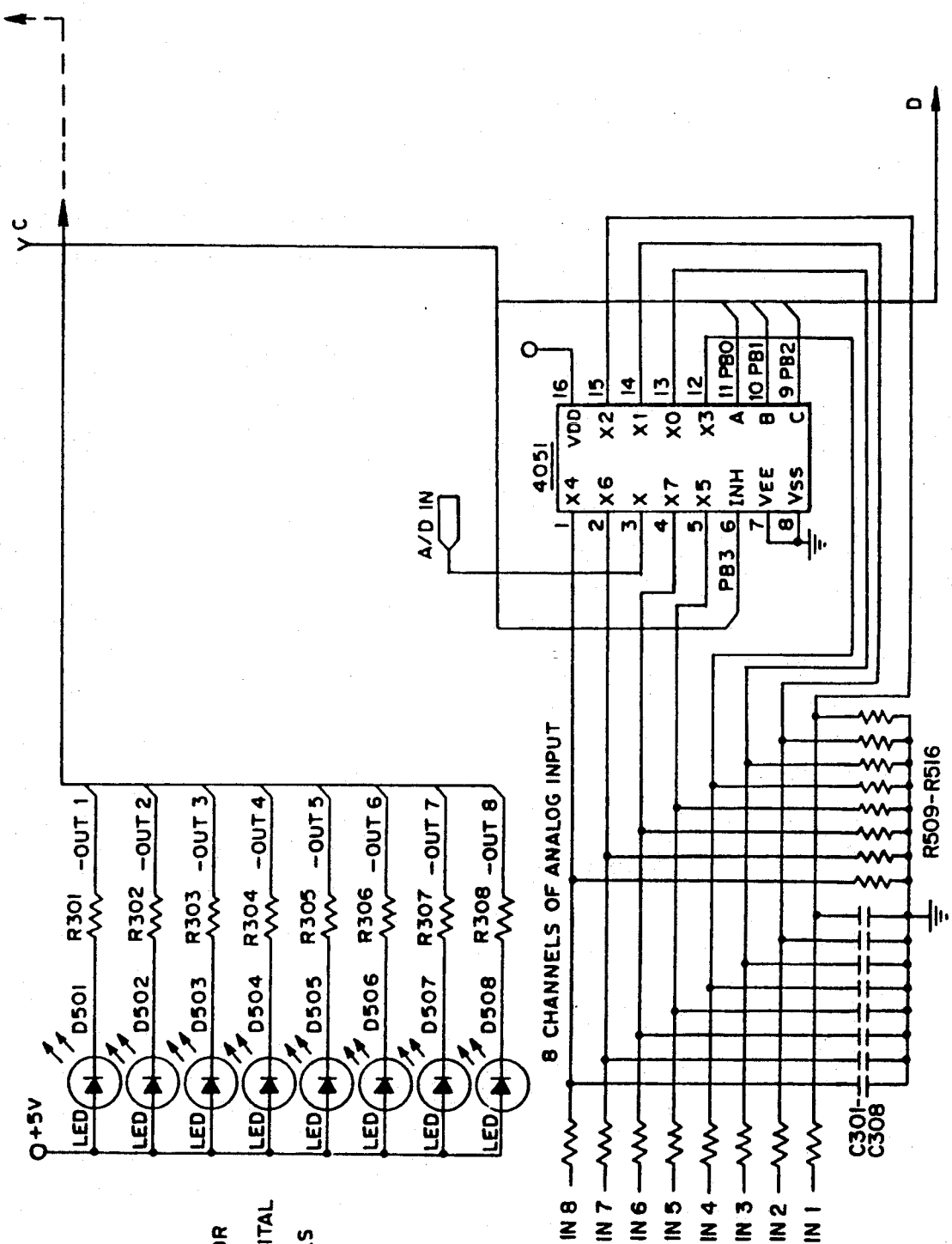
Figure 4D:
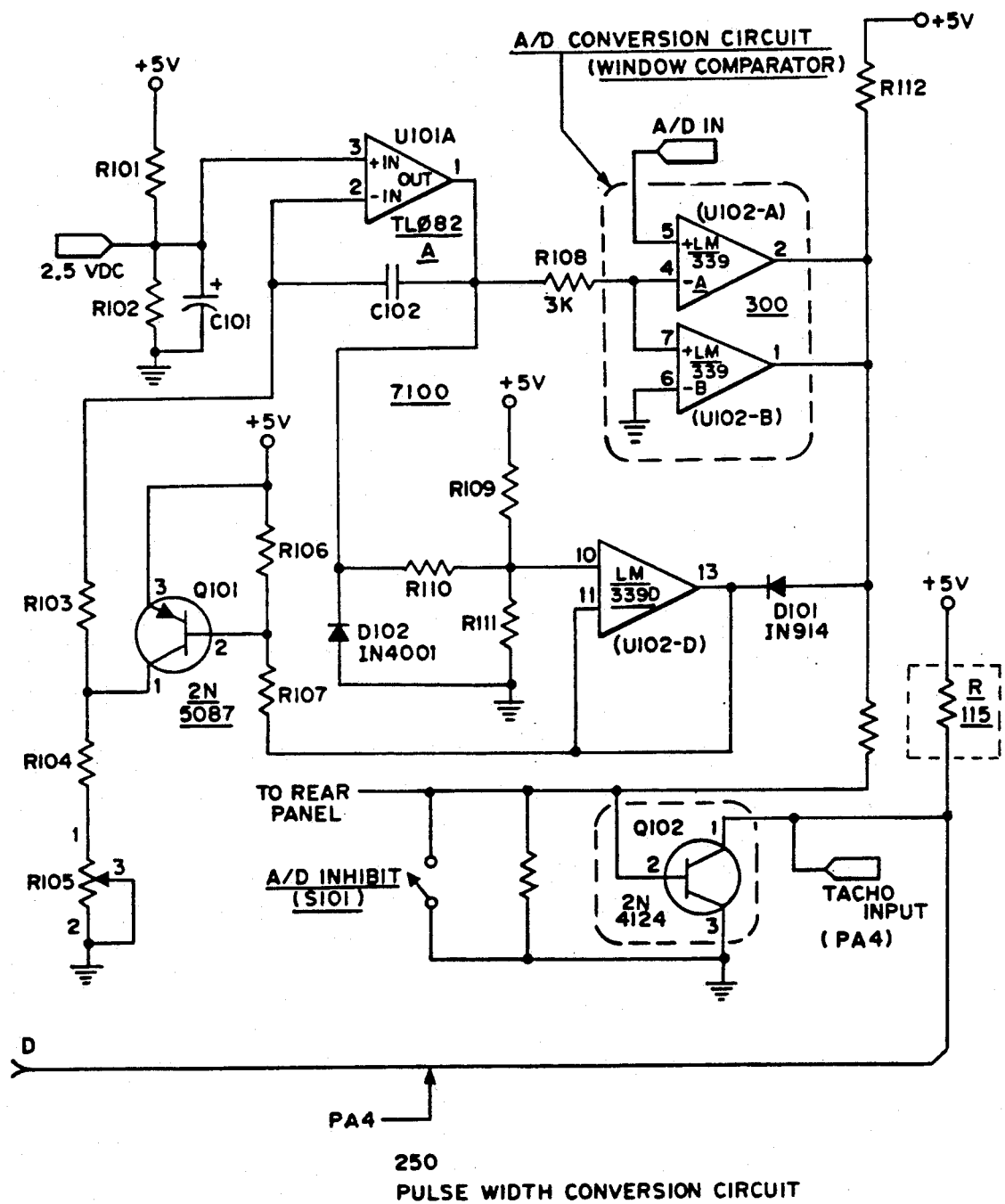

The front panel 12 of the device 10 includes first of all ten light emitting diode indicator lamps D501-D510 shown extendinq across the upper left corner of the front panel 12. One of these LEDs, D510, is connected to a power supply through a source resistor (not shown) for the device 10, and the next eight lamps, D501-D508 in FIG. 4C, are connected to the digital output lines (not shown) of the device 10 as will be defined hereinafter.

The tenth lamp D509, in the present embodiment of the device 10, is electrically engaged to indicate activity of a front panel switch S1. The front panel 12 of the device 10 futher includes the push button switch S1 which is shown at the left of the panel. This is identical to the trigger switch S1 which will be defined in connection with the description of FIG. 4A. The push button switch S1 is used in this embodiment to set a measurement request flag, in a normal mode of operation of the device 10, as will be described hereinafter.

The front panel 12 further includes a jack J1 which will accept a one-eiqhth inch diameter plug therein. This jack J1 will be defined in greater detail with reference to FIG. 4A and it will be seen there that the jack J1 is connected in parallel with the switch S1.

A further connector, a 9 pin subminiature "D" style connector 20 is further shown which is connected to ground and to analog input channels of the device 10 as will be described in connection with the description of FIG. 4C. Also, the front panel is seen to include two RCA phono type jacks J2 and J3. The jack J2 is connected to an analog input channel of the device 10 (shown in FIG. 4). The other jack J3 is connected to an analog output of the device 10 (FIG. 4). The connections of these jacks pass through connectors and the links to the interior hardware of the device 10 will be described in greater detail in connection with the description of the Figures referenced.

Figure 2:
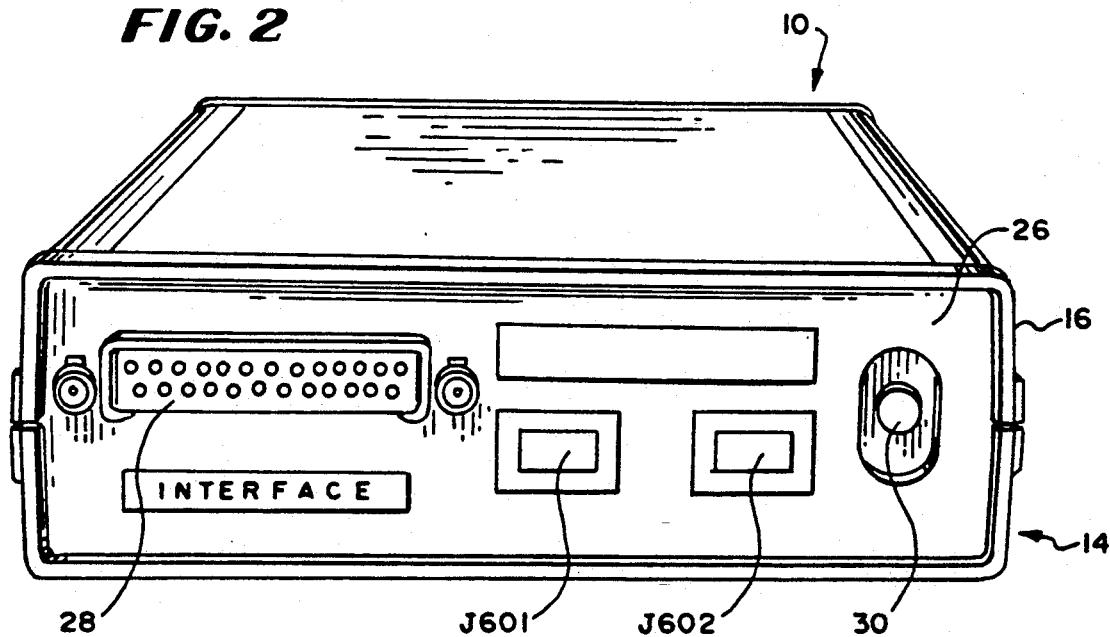
FIG. 2 is another perspective view of the device of the present invention and shows a rear panel and the top panel thereof.

Turning now to FIG. 2, there is illustrated therein a rear perspective view of the device 10. A rear panel 26 of the device is seen to include several items. The first item is a 25 pin subminiature (D) style connector 28 which is connected to various analog and digital signal lines present in the device 10. FIG. 20 sets forth the connections of the DB25 connector 28 in chart form. Two modular, four conductor telephone style jacks J601 and J602 are also noted on the rear panel 26. The connections to these within the device 10 will be defined in connection with the description of FIGS. 4 and 5. Finally, a power input jack 30 is provided for connection of an external power source to the device 10. This connection is shown as pins 1 and 3 of U4 in FIGS. 6 and 15 and will be defined in greater detail hereinafter.

The case or housing 14 of the device 10 is approximately five inches wide, five inches long, and one and one-half inches high, providing a device 10 which is extremely compact and is a mobile piece of accessory equipment for use with a computer, the device 10 not being cumbersome in the least.

Figure 3:
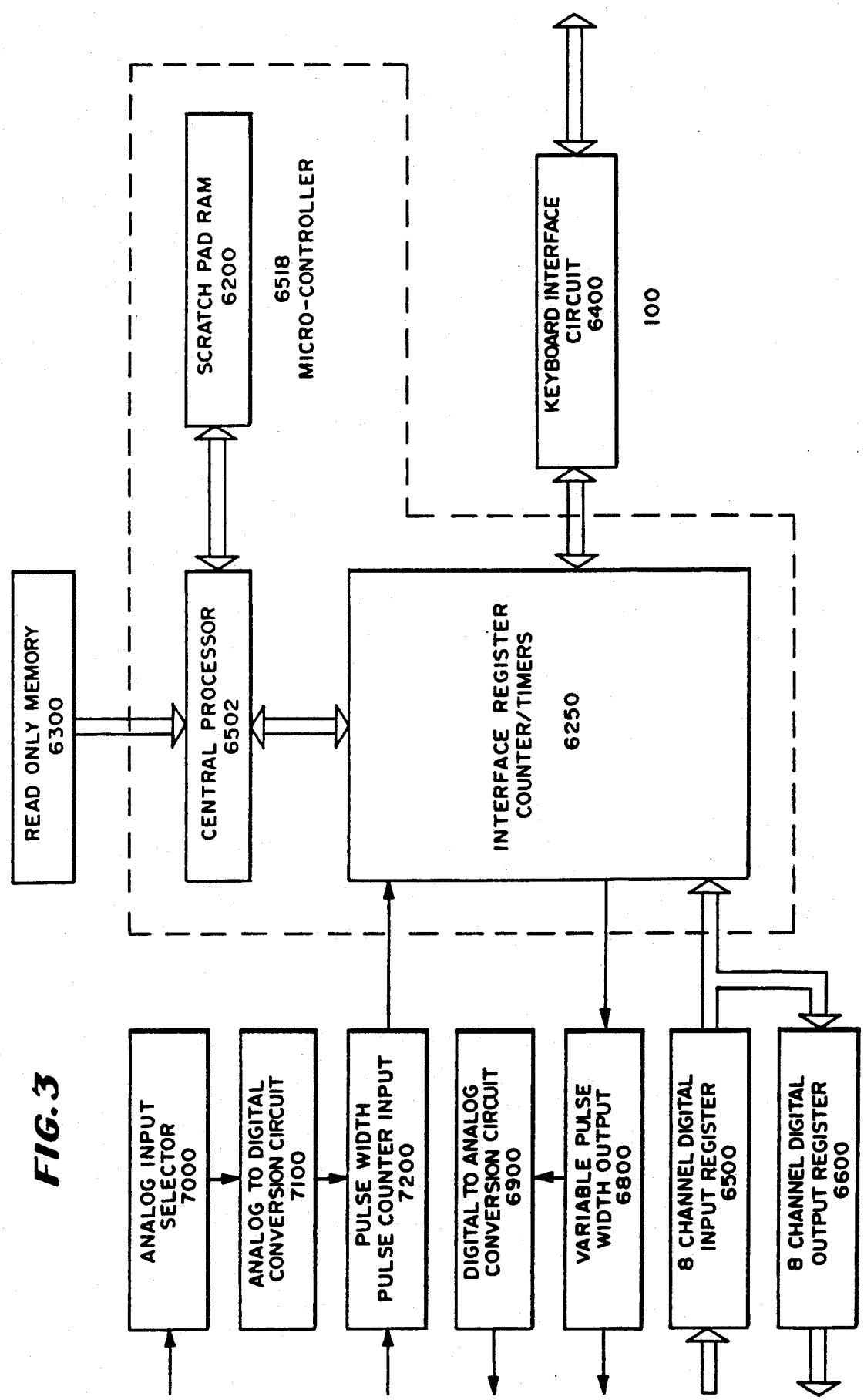
FIG. 3 is a block diagram showing a single chip microcontroller of the device and setting forth all internal functions of the device controlled thereby.

FIG. 3 sets forth a simple diagram defining the hardware of the device 10. As will first of all be noted, the internal functions of the device 10 are controlled by a single chip microcontroller, the controller in the present embodiment being a Rockwell one chip microprocessor part number R6518P hereinafter referred to as the 6518. It is to be understood that although specific devices are defined herein, these are not to be considered limiting, inasmuch as other manufacturers offer parts with similar functionalities, providing similar performances in such application.

The 6518 includes an enhanced instruction set type central processor 6502, a scratch pad random access memory 6200, and further, although not shown, a crystal controlled clock oscillator circuit, two parallel interface registers 6250, a serial interface shift register, and two counter/timers with a variety of input and output functions. An external read only memory (ROM) integrated circuit 6300 is used to store software programs written for the 6518. A keyboard interface circuit 6400 connects four of the lines defined above in one parallel interface register to connecters suited, in this particular instance, for use with the MacIntosh Plus (a trademark of Apple Computer Inc.) keyboard interface. The further circuits to be described below provide for input and output of both digital and analog signals.

The correlation between FIG. 3 and FIG. 4 will show the various circuits in the context of the overall design of the device 10.

The first bi-directional data lines which will be noted comprise the eight channel digital input register 6500 and the eight channel digital output register 6600 for the device 10. These registers 6500 and 6600 interact with the interface register (counter/timer 6250 to provide input to the input registers 6500 as well as receiving output from the output registers 6600.

Also an output is provided which is a variable pulse width output 6800. The output from the variable pulse width output 6800 may be directed to various devices or first may be filtered through a digital to analog (D/A) conversion circuit 6900 and then output to further devices.

With regard to input, an analog input selector 7000 has been provided which feeds its output to an analog to digital (D/A) conversion circuit 7100 which will also feed a pulse width measuring input 7200. It is to be noted that the pulse width input 7200 may also receive input from peripheral devices directly thereto, with all input in this particular circuit traveling through the pulse-width input 7200 prior to entering the counter/timer 6250.

Turning now to FIGS. 4A-D, there is illustrated therein a schematic circuit diagram of the components of the device 10 showing their interconnections.

Figure 15:
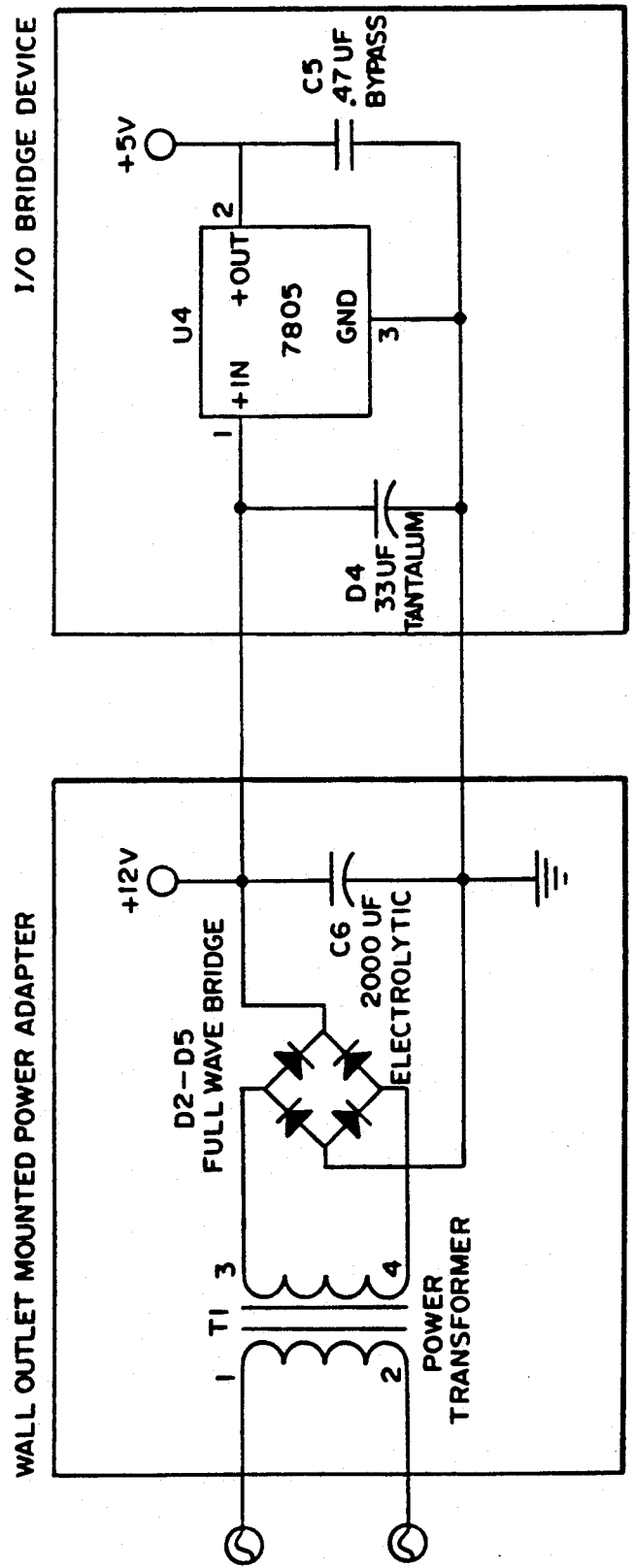
FIG. 15 is a circuit diagram of the power supply and filter and regulator therefor of the device of FIG. 1.

The device 10 is provided with a self-controlled external power supply (FIG. 15). This power supply is a unipolar supply providing working voltages within the device 10 which are primarily positive with respect to ground. The power is provided from a conventional wall outlet, is converted to DC power and is filtered within an adapter of the device to provide a source of single polarity voltage at about +9 volts. The power source may also be any suitable battery, such battery permitting remote field use.

The +9 volt supply is then regulated to +5 volts by a standard three terminal regulator integrated circuit and all digital circuits as will be defined hereinafter of the device 10 are powered from this +5 volt source. The comparators of the device 10, as will be defined hereinafter, on the other hand, are powered with +9 volts and ground, with their open collector outputs being pulled up to +5 volts to interface with the 6518. The comparators which have been chosen are of a special variety intended for unipolar applications, with PNP input stages which include ground in their common mode range. These comparators are defined as quad comparators to be described.

It is to be noted that operational amplifiers of the device require a negative supply voltage in order to maintain linearity, with their outputs being at or near ground. This negative supply voltage is provided by an integrated circuit indentified as U202 which divides the 6518's main clock signal (which is maintained at one MHz) down to a relatively low frquency. The signal is then amplified by Q201 and presented to Q202 and Q203. The push pull pair defined by Q202 and Q203 alternately charges C202 through D201 on positive swings and then charges C203 through D202 on negative swings, providing a result of a filtered negative DC voltage on C203. The voltage from here is then transferred to the operational amplifier negative supply pin. C201 has been inserted within the circuit to lengthen rise and fall times in order to reduce harmonics coupled into other parts of the device 10.

When power is supplied to the microprocessor 6518 of the device 10, it reads a reset vector address from the Read Only Memory 6300 which, in this case is an industry standard 2764 EPROM manufactured by the electronic manufacturer known as Hitachi. The reset vector directs the 6518 to a specific program sequence in the ROM 6300 which sets up all internal registers of the 6518 and also resets external registers contained in a parallel output circuit defined by data lines PIA BUS running to quad latches 74LS75, 1 and 2.

Once the reset procedure has been accomplished the 6518 then begins polling the keyboard interface circuit 6400 to determine when commands come in from a host CPU (not shown) and to determine when responses should be sent back to the CPU. This is done repetitively, many times per second, in a process that would seem transparent to the user, happening frequently enough that the user sees a response as virtually instantaneous.

The 6518 includes a 6502 type CPU with internal parallel registers and a serial input and output as well as other features described herein. The microprocessor 6518 has an internal clock oscillator connected to a two megacycle crystal XTAL-1.

The 6518 has a phase 2 output which is its main clock output that is derived from the crystal oscillator clock. The phase 2 signal is used to synchronize reading of the content of the Read Only Memory 6300 and is also used to synchronize the integrated circuit U202 which comprises a count down chip of a CMOS 4040 which is used to derive a low clock frequency which in turn drives power inverter 102. The power inverter 102 is used to generate a negative voltage of -5 volts which is supplied to a negative power input pin of the dual operational amplifier TL082.

The 6518 microprocessor has an external memory bus, CPU bus 106 through which data and program instructions from the ROM 6300 are received. The CPU bus 106 is multiplexed by way of a 74LS373 octal latch. The octal latch 74LS373 is used to hold address bits during a period of time at which data passes across the bus 106. The microprocessor 6518 uses a simple resistor 114 capacitor 112 reset circuit 108 connected to pin 20 of the 6518. A diode 110 is connected across the resistor 114 to speed up the response when power is removed, at which time the capacitor 112, which is connected from pin 20 to ground, discharges through the diode 110 rather than through the resistor 114. This provides a faster reset time than that provided by other standard circuits.

The microprocessor 6518 has both maskable and nonmaskable interrupts. The maskable interrupts are internal only. They arise in the internal interface registers 6250. The nonmaskable interrupt NMI, pin 22 is external only and is supplied by a comparator, LM339C which receives its input from the external switch 51 including connector jack J1. This allows the user to signal the 6518 when to take the reading to be sent to the keyboard interface 6400.

A 4049 inverter is used to invert the phase 2 enabling signal provided to the Read Only Memory 6300. This is necessary because the logic level of phase 2 is inverted from that necessary for the Read Only Memory 6300.

The device 10 further includes four integrated circuits, two 74LS75's and two 74LS125's. These constitute the input and output registers. Port B of the 6518 microprocessor has eight (8) bi-directional data lines PB0 - PB7. The four integrated circuits are used to expand the eight data lines to eight separate inputs and eight separate outputs as shown. The 74LS125's are actually gated tristate buffers. Each can be enabled separately by the microprocessor 6518 in order to impress incoming data onto the remaining data lines PB0 through PB3 of the parallel interface B register in the 6518 microprocessor. This connection is termed "PIA BUS" in FIG. 4B. The 74LS75 chips are output latches. Each 74LS75 is a quad latch with both inverted and non-inverted outputs. The non-inverted outputs Q are connected to the rear panel connector 28 of the device 10. The inverted outputs $\overline{Q}$ are connected to a series of 8 light emitting diodes D501-D508 with series resistors R301-R308, respectively, which limit the current being supplied to the LED's D501-D508. The purpose of the LED's D501-D508 is to indicate the status at any time of the eight (8) output lines OUT1 thru OUT8.

The 6518 executes a preprogrammed algorithm defined hereinafter for enabling each of the input and output registers of the device 10 in turn to selectively set or clear any of the output lines OUT1 - OUT8 and to selectively read any of the input lines IN1 - IN8. Execution of the algorithm is transparent to the user when the device is operating in the enhanced mode, to be defined hereinafter, via commands received from the CPU in the desk top computer.

An output low pass filter 150 is provided which receives pulse width modulated signals on the PA 5 line. The PA 5 line is a pulse width modulated output which can be varied, under CPU control, in duty cycle and pulse repetition rate. variations in duty cycle appear as variations in DC voltage at the output of the integrated circuit filter formed by operational amplifier TL082B. An additional RC filter 152 is present at the output of operational amplifier TL082B to filter any power supply noise that may be apparent at the output.

Two 2N4124 transistor inverters Q701 and Q702 are also provided for serial receive and serial transmit. This feature is mainly used for debugging, although it does have other uses.

The 6518 also has the serial interface shift register 6250 (FIG. 3) connected to PA6 and PA7 for debugging. A terminal may be connected to the receive pin 162 and transmit pin 164 to enter serial commands and to receive serial data from the 6518.

Turning now to the keyboard interface 6400, it is seen to connect four external signal lines 170, 172, 174 and 176 to the 6518's Port A register lines PA0, PA1, PA2 and PA3.

A clamping circuit 180 is provided on each keyboard interface line to form a voltage clamping network 190 to clamp input voltages, with back to back diodes D601-D608. Clamping is necessary to protect the inputs of the microprocessor 6518 from voltage spikes. Small value surge resistors R601-604 of 15 ohms each are also provided to limit current in case a short circuit on the lines should occur.

Turning now to FIG. 5, the jacks J601 and J602 for the keyboard and the CPU, respectively, are shown. It will be seen that the PA0 line 170 connects to a terminal labeled M Data, that is the CPU Data line. The M Data Line is seen to connect with pin 3 of the telephone style connector or jack J602. The signal line associated with pin 3 reaches the host CPU and connects to its keyboard interface (not shown) which allows data and commands to be passed back and forth therealong.

The PA1 line 172 is labeled M Clock. The PA1 line 172 is a clock line which is directed into the CPU through pin 2 of the CPU jack J602.

The PA2 line 174 is called K Data. The PA2 line 174 is the keyboard data line which is directed into a keyboard device through pin 3 of the keyboard jack J601.

The PA3 line 176 is called K Clock. The PA3 line 176 is a keyboard clock line connected to pin 2 of the keyboard jack J601.

Although the device 10 receives all of its power from an external power supply as defined above, the host CPU keyboard expects to receive its power from the CPU. Supply of such power is provided by a jumper 210 connected from pin 4 of the keyboard jack J601 to pin 4 of the CPU jack J602. The use of lines PA0 through PA3 defined above, it is to be understood, in this particular embodiment, relates to the MacIntosh plus computer interface.

Returning to FIGS. 4A-D, the eight analog inputs to the input selector 4051 can range in voltage from zero to five volts to produce an analog to digital (A/D) reading Inputs that are negative will result in a reading simply called "under". I inputs that are greater than 5 volts will result in a reading of "over". In other words such readings are beyond the linear limits set for the device, in the present embodiment, although this is not to be considered limiting The design can be modified to accommodate an input range from zero volts to 10.0 volts.

The tachometer input PA4 is expected to be a pulse width, ranging from a logical low between zero and +0.8 volts to a logical high ranging from +2.5 volts to the positive supply therefor, which is +5 volts.

The keyboard inputs and outputs consisting of K data 174, K clock 176, M data 170, and M clock 172 are standard logic levels having a logical low of between zero to +0.8 volts and a logical high of from +2.5 volts to +5.0 volts.

The trigger input S1 which generates a nonmaskable interrupt in the 6518 is considered to be a switch closure to ground. The interrupt voltage would be active at any input voltage below 2.0 volts. There is a slight amount of hysteresis built into the circuit equal to about ten percent.

The pulse width modulated output PA5 has a standard logic level. The output signal is pulled up to the positive rail with a resistor R401 of 4.7 k-ohms. When PA5 output logic level is low, PA5 is pulled down to ground by an open drain transistor device internal to the microprocessor 6518. This output is connected internally to the analog output filter comprising TL082B with associated subcomponents through buffer resistor R 404. The voltage level output of that filter ranges from close to zero to a high level of approximately 5.0 volts.

A special input called "A/D inhibit" is shown in the schematic as a switch S101 to ground. The switch S101 is used to disable the buffer Q102. Disabling buffer Q102 permits external inputs to operate the tachometer input, PA4. If the A/D inhibit switch S101 is not closed, then signals from the A/D conversion circuit 7100 would interfere with any pulse width signals presented to PA4 from outside the device 10.

The digital output registers 74LS75's are standard LS devices including low power Schottky transistors in their internal structure There are eight output lines per register which are conventional totem pole outputs common in the industry. There are eight input lines which are conventional multiple emitter input circuits commonly used in the industry The standard logic levels, are, on output, a low from zero to 0.4 volts and a high from 2.5 to 5.0 volts. On input, a logic low consists of between zero to 0.8 volts and a logic high of from 2.0 to 5.0 volts, as is common in the industry.

Using the simple example of measuring the voltage of a battery with regard to operation of the device 10, the battery is connected to one of the analog input selection channels. The signal is attenuated by one of the resistors R501-508 and by cooperating resistor R509-516.

The attenuated signal is presented to one of the X inputs of the 4051 analog multiplexer. In the simple case of measuring the battery voltage the attenuated signal could be connected to XO.

XO is selected by lowering PB0, PB1, and PB2 in the 6518, thus lowering lines A, B, and C of the analog multiplexer. The selected input is presented to the multiplexer output labeled X, Pin 3. From there the analog input travels to the A/D input connection which is the noninverting input of the LM339-A, Pin 5. This is the input to the window comparator 300 which is considered the upper limit. The 6518 waits for a conversion cycle to start, at which time the output Pin 1 of the TL082A is slightly below zero volts and rising in linear mode. As it rises through zero, the comparator LM339B releases its output line which goes high, and is inverted through the 2N4124 transistor Q102 pulling PA4 low. This starts a timing cycle inside the 6518. The 6518 counts micro seconds (clock cycles), as the linear input rises.

Referring to FIG. 8, the ramp voltage rises through zero at which point LM339B releases its output line. In FIG. 8 this is called the comparator output and it rises to a high logic level or to a true state. As the linear ramp increases in voltage eventually it will pass through the A/D input voltage. In the case of the measurement of battery voltage the input begins at 1.5 volts, which is attenuated to roughly 1 volt. As the linear ramp rises through 1 volt LM339A will pull the output logic level low, or to a false state. This is shown as the comparator output falling to a low state after the ramp passes through the input voltage. This in turn biases off the inverting transistor Q102 allowing the PA4 input to rise. This halts the timing cycle in the 6518. The number of microseconds that have been counted is stored in the timer register. Further counts do not occur at this time. The 6518 reads the number of counts from the timer register. Since it acts as a countdown timer, the 6518 executes a subtraction process to get a positive number of microseconds during which the comparator output was true. The duration of time for which the comparator output was true is linearly proportional to the A/D input voltage.

Figure 16:
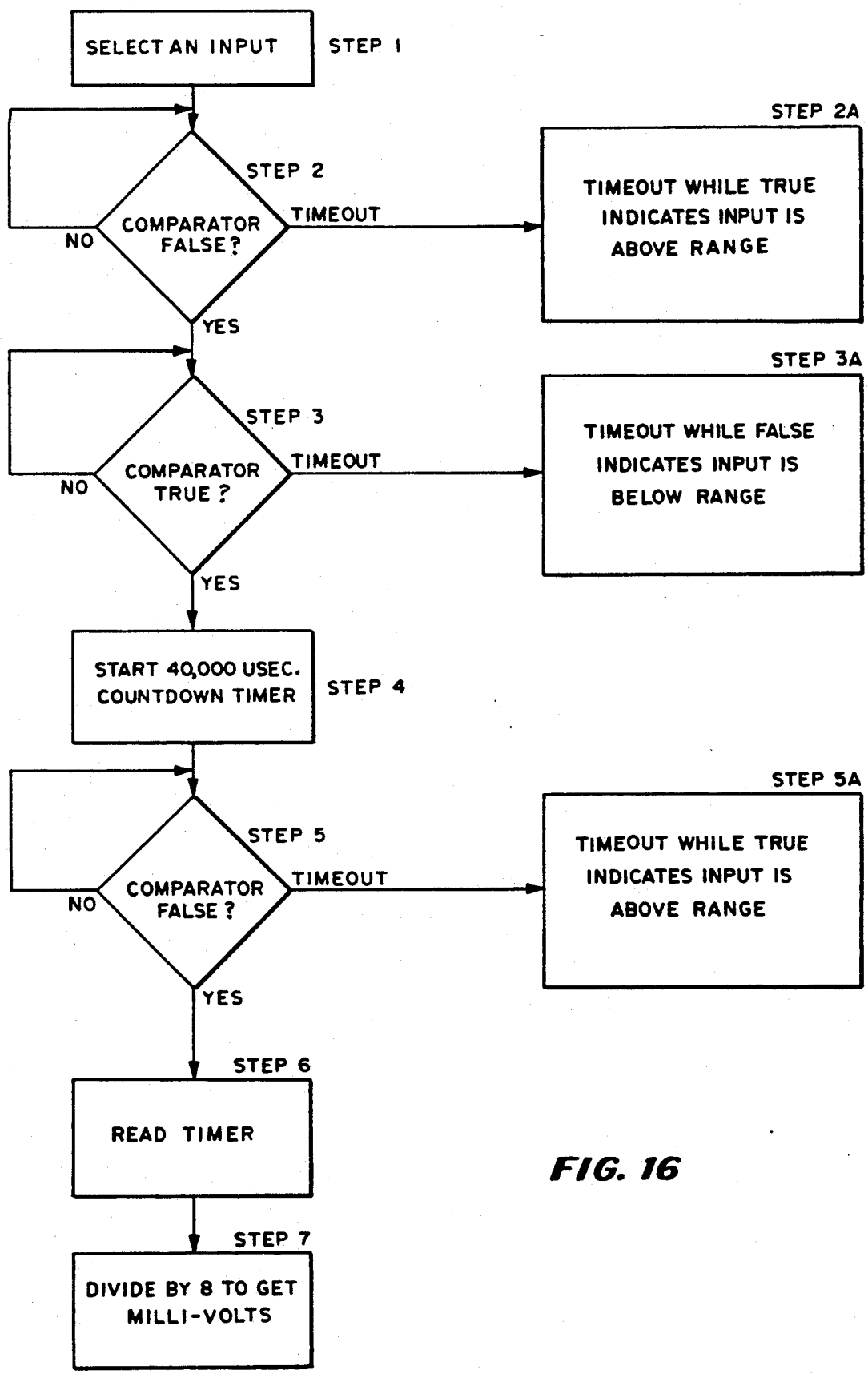
FIG. 16 sets forth a logic flow diagram of an algorithm used by the microprocessor to convert the window comparator's pulse width output into a digital representation of the measured voltage.

An algorithm of FIG. 16 when performed, provides the number of millivolts above 0 volts which are present at a given analog input These analog inputs are attenuated and connected to the input selector.

A binary value is produced in this manner establishing the exact number of millivolts that have been measured. This measurement can then be converted through the algorithm of FIG. 19, to a decimal value which can then be converted to a text string, which in turn can be transmitted to the host CPU.

In order to receive a digital input, the 6518 alternately enables one of two buffers, each buffer presenting four input lines to four lines of the 6518. The lines of the 6518 that receive the digital data are PB0, PB1, PB2 and PB3. The input buffers are enabled by lines PB6 and PB7. Only one buffer is enabled at a time so that the data does not conflict. In outputting the digital data the 6518 disables both input buffers, supplies the data to PB0, PB1, PB2 and PB3, and then clocks either the 74LS75, 1 or 2. Each of the 74LS75 circuits has four output lines. These are latched and will hold the values clocked into them, regardless of further states of PB0 through PB3.

The pulse width modulated output is a variable duty cycle, variable pulse rate output which is controlled by setting two timer registers inside the 6518. One timer register stores the number of microseconds for which the output is high. The other register stores the number of microseconds for which the output is low. By setting the two registers, the overall duty cycle and repetition rate can be set for the pulse width modulated output. Once the repetition rate has been set, an approximately 5 volt square wave of a known duty cycle is presented to the analog output filter of pulse width conversion circuit 250. The square wave is then filtered and produces a DC voltage linearly proportional to the duty cycle of the pulse width modulated output. The pulse width modulated output is supplied to PA5, which can serve an alternate function.

PA5 is also usable as an event counter input. The two functions of PA5 cannot occur simultaneously, but the internal registers of the 6518 may be set to count external events consisting of logic pulses presented to PA5 from outside the device 10. The logic pulses are counted and totaled within the 6518 registers and are enabled for transmission to the CPU under special command An alternate use is also proposed for line PA4 of the 6518. Such alternate use is provided for measuring the width of external pulses For instance, a logic signal present in an experiment could be connected to line PA4. The 6518 then could determine the low logic duration of a pulse accurately to within one microsecond, over an unlimited range. In this respect it will be understood that the counter register can count any number of pulses up to 65,535, setting 16 bits. Beyond 65,535 pulses, interrupts can be generated by the counter register to keep a tally of counter overflows. By such means any number of microseconds can be counted. The same unlimited range is available for counting external events via line PA5; thus any number of events can be counted.

The outputs from the 6518 are applied in two different modes, one for the MacIntosh plus and another for the MacIntosh 11. (MacIntosh is a trademark of Apple Computer, Inc.)

For the MacIntosh plus, the designations M-data, M-clock, K data, K clock apply. M-data is a bi-directional data line which is pulled high by a resistor on the computer side. It can be pulled low either by the MacIntosh or by the 6518 through PA0. The logic state of line PA0 is also monitored by the 6518. M-clock is an output only which is presented to the MacIntosh and is only controlled by the 6518. The K data line is bi-directional and is connectable to a conventional MacIntosh keyboard or other compatible keyboard bus device It is bi-directional and can be pulled to a logic low level by either the 6518 or the keyboard device. The line voltage is pulled up by a resistor inside the 6518. The K clock line is only operated by the keyboard which is externally connected. The K clock line is exclusively monitored by the 6518 CPU through PA3.

Figure 14:
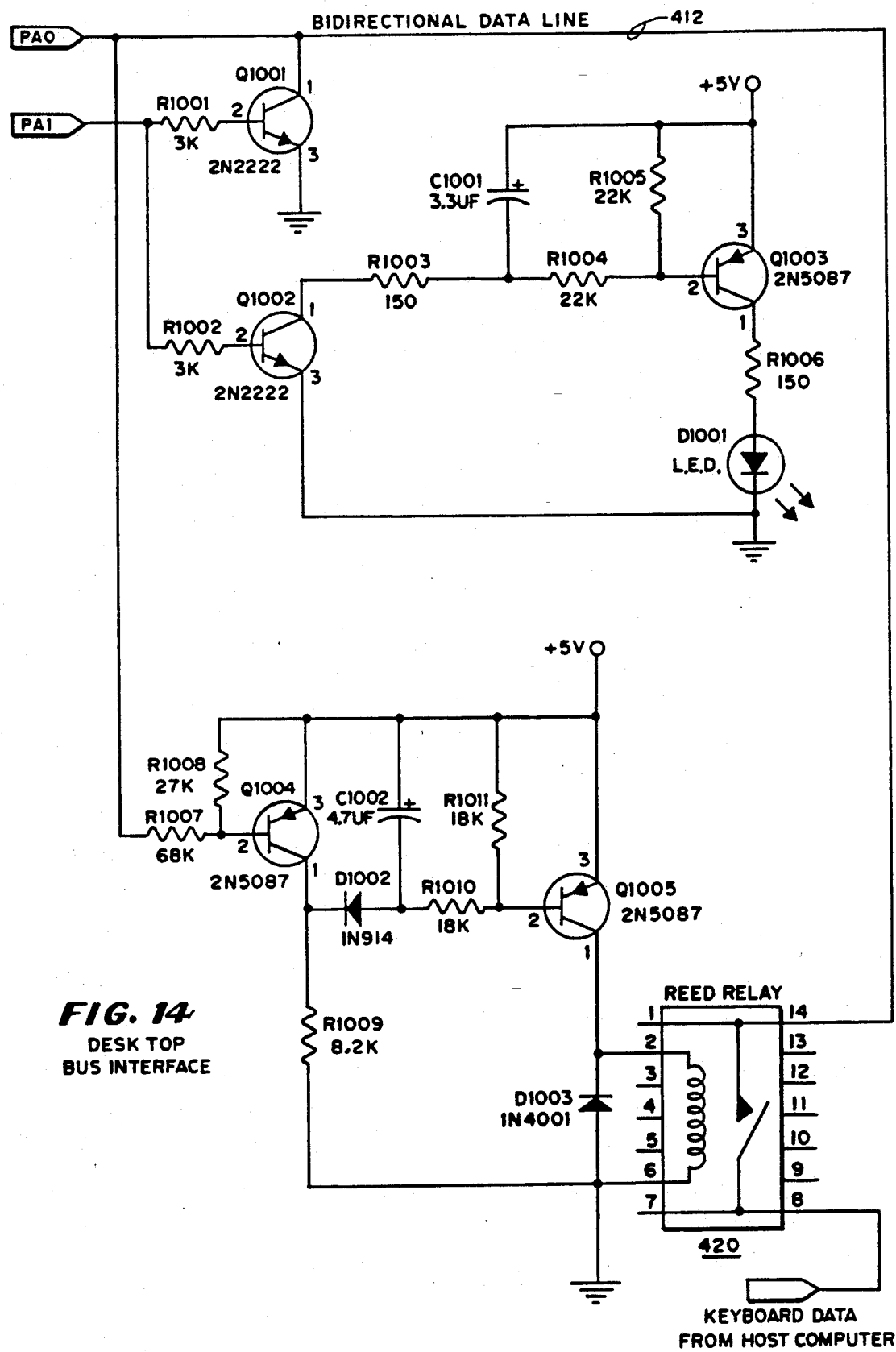
FIG. 14 is a circuit diagram of the bidirectional data line of the device of FIG. 1.

When placed into operation in the MacIntosh II mode, only two lines are used; one to monitor the status of the bi-directional data bus line and the other to operate a transistor inverter which is able to pull that line to logic level low. Therefore the 6518 can both read data and send data over the single bi-directional data line, as shown in FIG. 14.

In the normal mode, operation of the device 10 can be executed in two different manners. The first thing that can happen is that the user can press on a key on the keyboard. The device 10 must respond to that keystroke in order to pass the key codes through to the CPU when using the MacIntosh Plus.

When connected to the Apple Desktop Bus the device 10 behaves differently.

With the MacIntosh Plus the device 10 senses that a keystroke has occured by the signals present on lines PA2 and PA3 of the keyboard interface 6400. The device 10 decodes the signals, reencodes them, presents them on signal lines PA0 and PA1 to present those key codes to the MacIntosh CPU.

Obviously, if multiple devices 10 are connected in series, each, in turn, receives keyboard responses and sends them toward the CPU, each device 10 also receives commands issued by the CPU and sends them toward the keyboard.

With the Apple Desktop Bus, since it is a parallel bus, the device 10 looks for commands directed only to it, specifically by address.

The Apple Desktop Bus protocol provides for sixteen logical addresses at which a device may exist. Usually only one device is connected per address. In the normal mode therefore, operation of the keyboard is transparent to the user, i.e., the user presses a key, the CPU receives the key stroke.

The device 10 is powered via an AC outlet as shown in FIG. 6 — and in more detail in FIG. 15. A wall outlet adapter provides a +9 volt filtered DC output to the device 10 through the rear panel connector 30. The rear panel connector 30 is connected to a type 7805 monolithic three terminal regulator labeled 7805 which provides a +5 volt filtered and regulated output. Bypass capacitors C4 and C5 are provided as an intermediary between input and output.

The +5 volt output is directed to all of the digital integrated circuits defined above and to all of the pull up resistors shown throughout FIG. 4 in the device 10.

The unregulated but filtered +9 volt output is directed to a voltage inverter circuit 102 at a collector pin 2 of a transistor 2N4124 and also to a positive power supply pin, pin 8, of an operational amplifier TL082 and to a positive power supply pin, pin 3 of a quad comparator LM339 A.

To take an analog measurement using the device 10 in the normal mode of operation the user presses trigger switch S1 activating a trigger 116 of the device 10. This pulls down the noninverting input of comparator LM339-C, and in turn pulls down pin 22 of the 6518, which is the nonmaskable interrupt, generating an interrupt.

When the interrupt occurs, an address vector is fetched from the Read Only Memory 6300, pointing to a routine, which is then executed In the device 10, execution of that routine sets a flag so that, when the 6518 observes that no key strokes are being pressed and no commands are being received from the CPU, the 6518 checks that status bit and, if it has been set, the 6518 begins an analog input sequence, using the analog A/D converter 7100 by sensing the signals present on PA4.

The 6518 does not output any signals during the conversion cycle. It merely reads the pulse width of pulses present on line PA4 according to the algorithm programmed in the 6300 shown in FIG. 16. After the 6518 senses a complete pulse, measures its width and calculates the related input voltage, the input voltage is converted to ASCII text in a scratch pad memory 6200 (FIG.3) of the 6518. The ASCII text is then converted to, in this instance, MacIntosh key codes. The key codes are arbitrarily assigned codes determined in this case by Apple Computer each of which relates uniquely to a particular push-button on the keyboard assembly. The 6518 through unique programming generates key codes which emulate the keyboard completely and presents the key codes to the CPU of the MacIntosh via signal lines PA0 and PA1. Thus the CPU, upon receiving the codes from the 6518, assumes that the user has typed in the numeric value via the keyboard assembly.

Typically, a single input of the analog multiplexer is selected, usually input zero, shown at pin 13, of the 4051 analog multiplexer. The user can also elect to take multiple measurements when the trigger switch 116 is closed.

In that case, the 6518 will in turn connect several inputs of the 4051 analog multiplexer to the A/D conversion circuit 7100, measure the pulse width, convert each width into a decimal ASCII string, convert each string into a series of key codes, and send those key codes to the CPU, with each measurement followed by a field delimiter, typically a tab key code, and following the complete sequence of measurements with a record delimiter, usually the key code for the return key.

Inverting transistor Q102 is interposed between the output of the window comparator 300 and the PA4 signal line, pin 26 of the 6518. The inverter Q102 is needed because the 6518 is designed to measure negative going pulse widths while the output of the window comparator 300 is provided as a positive going pulse. The inverter Q102 is thus necessary to allow the 6518 to process the output of the window comparator 300.

Additionally a feature called "A/D inhibit" S101 is provided in this circuit and is called upon as necessary to disable the inverter Q102 so that other external signals can be supplied to line PA4, allowing the 6518 to make pulse width measurements, aside from any A/D conversion. The "A/D inhibit" S101 would be closed for instance during tachometer or speed measuring operations such as the measurement of the speed of a rotating device or rotating piece of machinery, etc.

There are 8 digital output lines OUT1 - OUT8 available to the user which can only be controlled in the enhanced mode of operation of the device 10. The output lines can only be controlled by sending special commands from the CPU to the device 10. The output lines are not normally controlled in the absence of special driver software loaded into the CPU.

Each of the eight output lines can be independently set to a logic true, +5 volts, or to a logic false, 0 volts.

Eight indicator light emitting diodes D501-508 show immediately the status of these output lines.

In operation of the device 10, the output lines OUT1 - OUT8 would be connected to relays or other circuit devices so that the user could control, for instance, the lights in a house.

In this example, a relay could be closed or opened to turn a light on or off, or alternatively a relay could be closed or opened to turn a heater on or off, etc. The digital output lines OUT1 - OUT8 could also be used to control an alarm, a beeper, a buzzer, a bell etc., to signal the user that some conditional parameter is outside of limits set by the user.

In the enhanced mode, additional input conditions can be measured beyond the simple analog voltage measurement defined above.

Again this can be accomplished by generating special commands in the CPU other than those normally sent to the keyboard device.

For MacIntosh Plus applications, normally the keyboard device only receives a selftest command, a command to which it responds with its model number, to advise what keyboard is connected and a command for reading the status of the keyboard and whether any key is depressed or not.

Additional commands have been developed as will be defined hereinafter which are input to the 6518 signal lines, over the lines labeled M Data and M Clock. These special commands are trapped by the 6518 and do not reach the actual keyboard connected at the end of the circuit. The 6518 responds immediately to these special commands by executing stored instructions such as, for instance, setting or clearing digital output lines, immediately reading the digital input lines, carrying out special pulse width measurements on PA4, or initiating an interval of pulse counting on PA5. The values from such measurements are put into a 6518 register apart from the 6518 register which is used to hold the ASCII character string equivalent of the digital voltage.

The measurement values are sent directly to the CPU through PA0 and PA1, here in a condensed binary format rather than using MacIntosh key codes. The binary format presentation results in a significant compression of the data. Using key codes requires two response bytes for each text character, one byte for key down and one byte for key up, while the condensed binary format allows the sending of two bytes containing 16 bits of digital information, which is sufficient to respond to most of the special commands.

Each special command has a varying number of bytes which it expects in response. The special driver software, which patches the MacIntosh software keyboard driver, traps incoming response codes, converts them into a format useable by the calling software program and returns those values to the calling program. Typically the calling program could be written in a high level language such as Basic or Pascal. The calling program also could be a data-base such as Omnis 3 Plus or a Hypertext program such as Apple's Hypercard application.

ANALOG TO DIGITAL CONVERSION

With reference to FIG. 7, for the particular embodiment of the device 10 disclosed, the single slope pulse width conversion circuit 250, with certain enhancements which provide key benefits including high resolution and accuracy, as well as relatively fast conversion time, has been developed. Common practice in designing single slope A/D converters includes providing a linear ramp generator and a comparator therefor. As shown in the Figure, the A/D converter in the device 10 consists of a free running linear ramp generator (TL082A/Q101/LM339-D) and the window comparator 300 with an enable input, (A/D IN) analog signal input.

As illustrated in FIG. 8, the window comparator 300 provides an output which is true (high) only when its input voltage is between the upper and lower limit reference voltages. Since the lower limit reference voltage is connected to ground and the upper limit reference voltage is connected to the A/D input, the width of the comparator's output pulse during the linear ramp is directly proportional to the voltage present at the A/D measurement input A/D IN. If the A/D input voltage nears zero volts, the pulse width will approach zero microseconds. If the A/D input voltage nears full scale (+5 volts DC nominal) the pulse width also will approach its full scale value (40,000 microseconds nominal). Use of a three input window comparator 300 (as opposed to a simple two input differential comparator) allows the zero crossing of the ramp voltage to be precisely determined, as shown. Use of the free running linear ramp generator allows the circuit to be interfaced with the 6518 with only one pulse width input line and no output lines. Since the window comparator 300 will provide an output pulse with both rising and falling ramp voltages, a reset output is connected from the ramp generator to the window comparator to disable it during the reset (downward) ramp. Thus the ramp generator can be designed for maximum accuracy and repeatability during the rising ramp.

Figure 9:
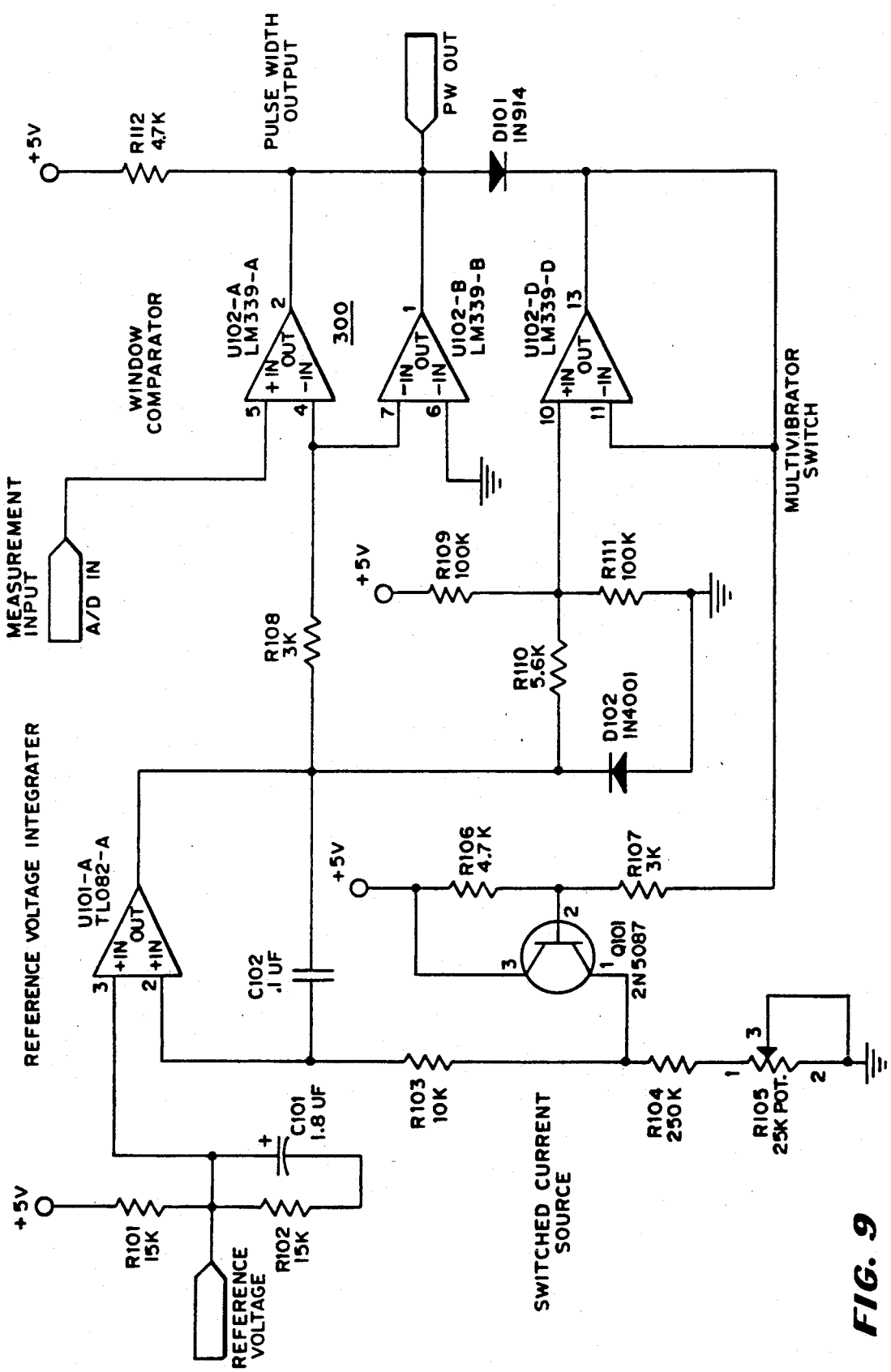
FIG. 9 is a schematic diagram of the circuitry of the single slope analog to pulse width converter of FIG. 5.
Figure 10:
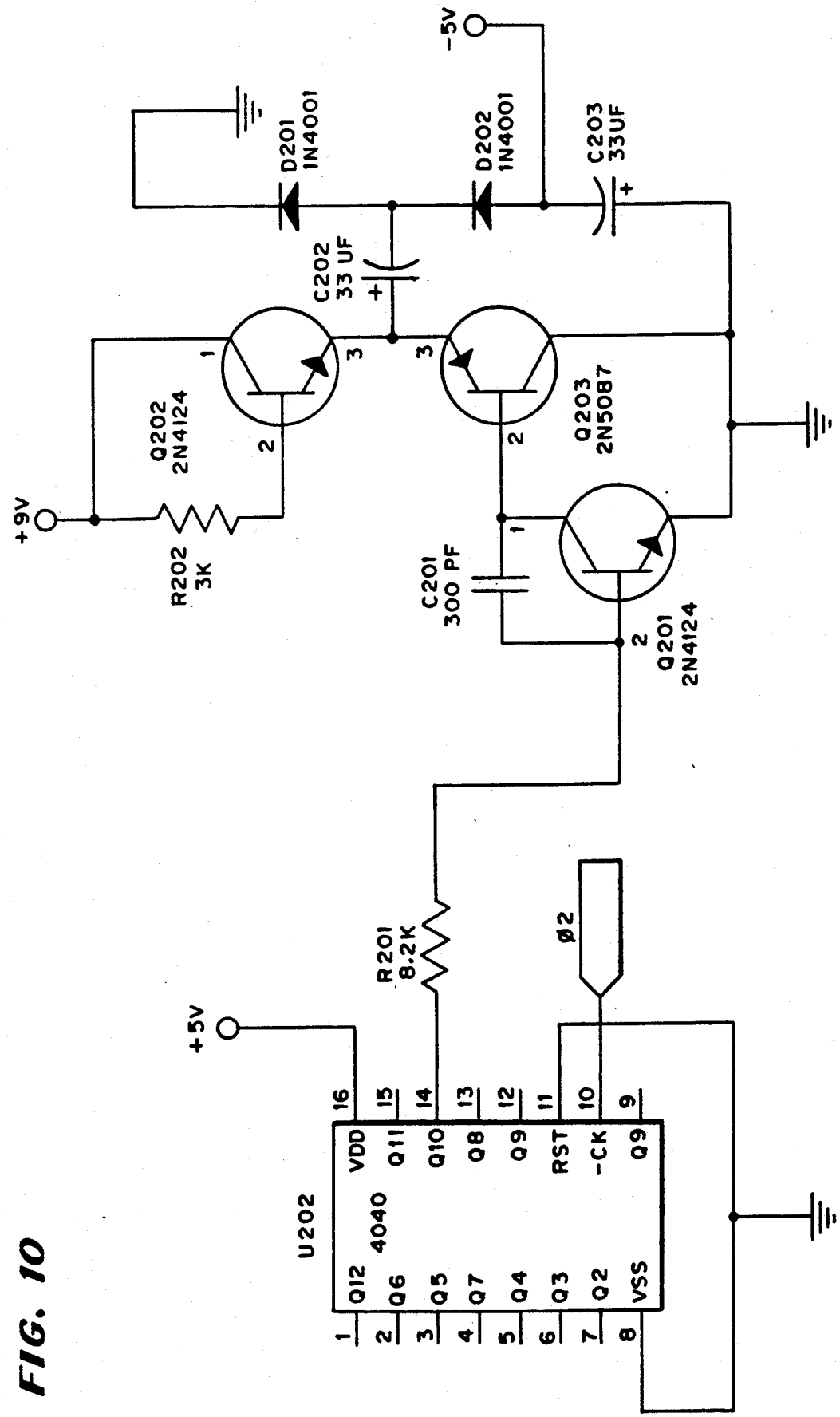
FIG. 10 is a schematic diagram of the circuitry of a power supply voltage inverter of the device of FIG. 1.
Figure 11:
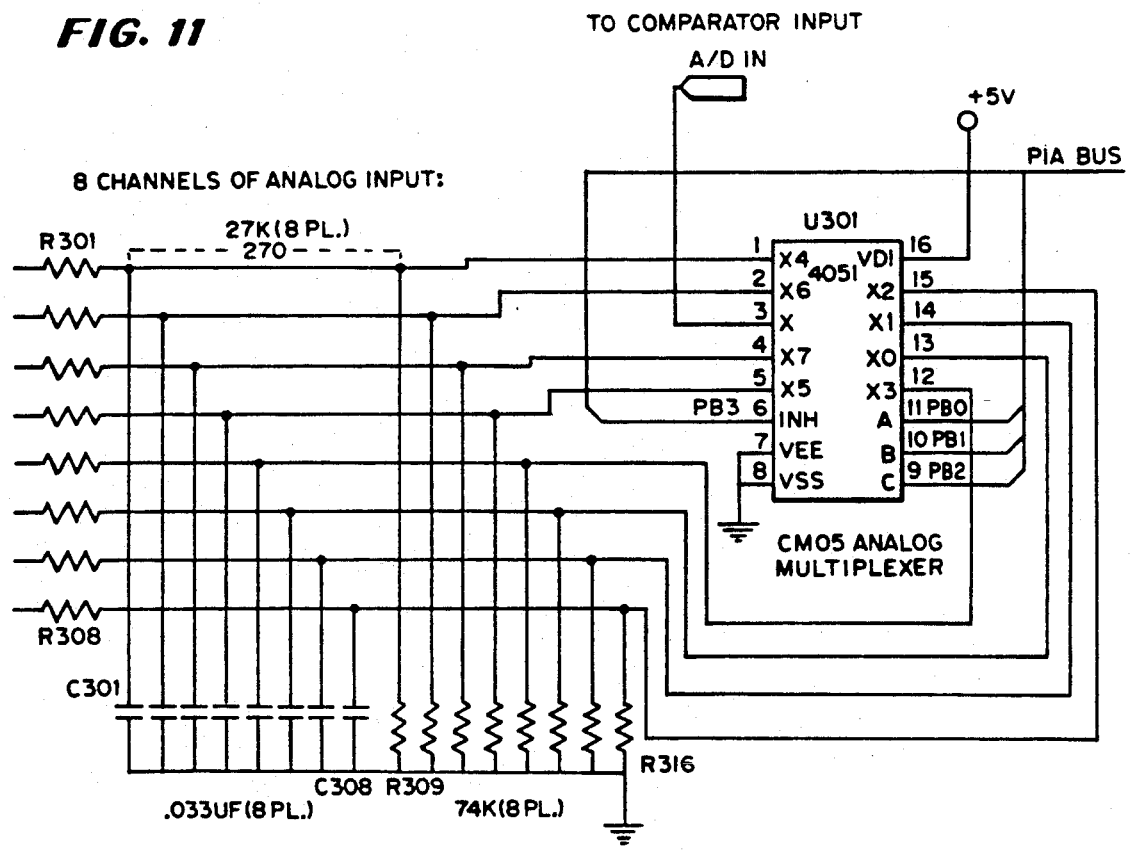
FIG. 11 is a circuit diagram of an eight channel analog input selector of the device of FIG. 1.
Figure 12:
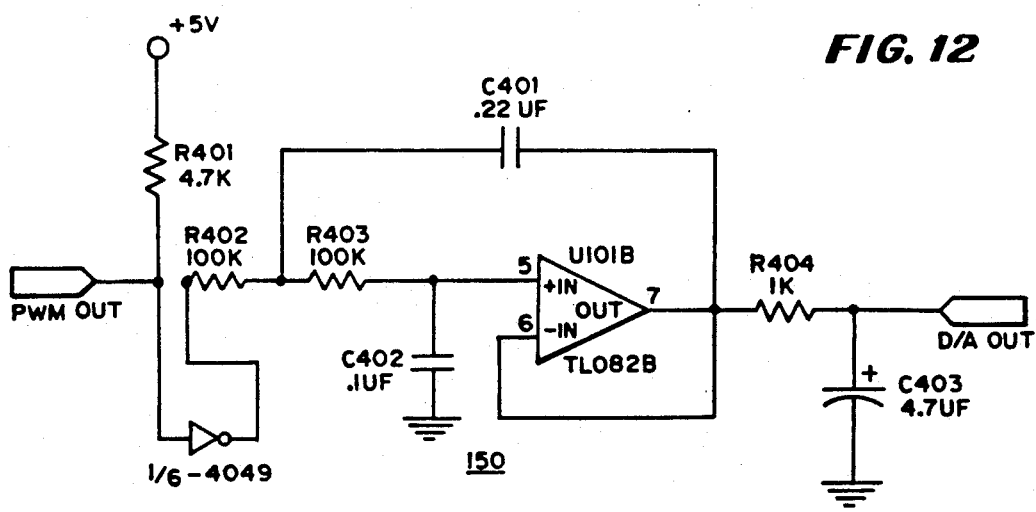
FIG. 12 is a circuit diagram of a pulse width to analog output filter of the device of FIG. 1.

Turning now to FIG. 9, there is shown therein an enlarged detailed schematic of the single slope A/D conversion circuit 7100 utilized in the bridge device 10 of the present invention. The window comparator 300 in this particular embodiment, is implemented with two comparators LM339, A and B. The comparator outputs are connected together in wired-or fashion and are pulled up by a 4.7 K Ohm resistor R112. The linear ramp generator is implemented with a JFET operational amplifier TL082A, a comparator, LM339D, and a PNP bipolar transistor Q101. The output of the window comparator 300 is disabled during ramp reset by a diode D101. Although only one window comparator 300 is provided in the present embodiment, it is to be understood that a single linear ramp generator can serve multiple comparators 300 if it is desired to make more than one measurement at a time.

JFET operational amplifier TL082A forms an integrater with a capacitor C102. With such an integrater, given a reference voltage at the noninverting input pin 3 of the op amp TL082A, the output will drive a current through the capacitor C102 equal and opposite to current reaching the inverting input, pin 2 of TL082A from all other sources so that the inverting input, pin 2, will be held at the same reference voltage.

The reference voltage, derived from the +5 volt regulated power supply as defined above, via resistor chain R101 and R102 is 2.5 volts. The only other current source (aside from input bias current, which is infinitesimal) is through resister R103. Whenever PNP bipolar transistor Q101 is biased OFF, the current through resister R103 is equal to (2.5 volts / (R103 + R104 + R105)), or approximately 9.2 microamps. When a constant current is passed through a capacitor in this manner, the voltage across its terminals changes as defined by the formula:

$$\text{Change (volts)} = \frac{\text{current (amps)} \times \text{time (seconds)}}{\text{capacitance (farads)}}$$

In the present embodiment, this calculates to 9.29 microamps times 40,000 microseconds divided by 0.1 microfarads, equaling 3.68 volts.

The analog input conditioning circuit to be described hereinafter will attenuate the input range to match the 3.68 volt converter full scale input.

When the ramp voltage exceeds an upper limit set by comparator LM339D, the comparator's output changes state, by turning PNP bipolar transistor Q101 on, via resistor R107, causing a larger current (about 300 microamps) to flow in the opposite direction through resistor R103, causing the op amp TL082A to discharge capacitor C102 in about 1200 microseconds.

When the ramp voltage is returned to a lower limit set by comparator LM339 D, the comparator changes state again, repeating the measurement cycle.

Since the comparator LM339D has a 100% positive feedback from its output to noninverting input, the lower limit is ground, and the upper limit is the positive supply. An attenuator (voltage divider) consisting of resistors R109, R110 and R111 allows the actual ramp voltage to slightly exceed these limits, so that the circuit is well stabilized in its linear mode during an actual measurement cycle (during the window comparator's true output pulse).

Resistor R106 is added across the base emitter junction of PNP bipolar transistor Q101 to reduce the effect of any leakage current from comparator LM339D's output during the measurement cycle. Leakage current through PNP bipolar transistor Q101, when it is biased off, is expected to be ten nano-Amps or less at room temperature, introducing an error of 0.1% or less in the current through resister R102 during the measurement cycle.

Power supply noise and ripple is also effectively isolated from the current source by PNP bipolar transistor Q101 during the measurement cycle.

Diode D102 and resistor R108 are added to the circuit to prevent a latchup condition, which could occur when power is supplied to the circuit.

Resistor R105 is an adjustable potentiometer which provides a convenient adjustment for the full scale value of the converter. The resistor R105 is used to compensate for variations in the value of capacitor C102 and in the voltage reference resistors R101 and R102. No zero adjustment is provided in the present design, since the zero crossing detection feature of the converter reduces zero errors to only the voltage offset of the window comparator 300, typically 2 millivolts or less.

Specific software programs to be defined hereinafter have been developed to be run by the 6518. These programs have been developed externally and then written into the Read Only Memory 6300 which is electrically engaged to the 6518 during operation thereof. As will be illustrated the software has been developed to maximize the effectiveness of the device's hardware by co-operating closely with the hardware.

Several new hardware developments to be defined and with particular reference to the A/D converter, would not have been posible without such close coupling between hardware and software.

In the normal mode of keyboard emulation, no new software is needed for the desktop CPU. The device 10 will input measured values, after modification thereof, directly into spreadsheets, into word processing documents, into database screens, into statistical analysis programs or into programs written in higher level languages such as Basic and Pascal. In each case the effect on the program is just as if the user had typed the measured values on the keyboard, followed by an appropriate delimiter.

In the enhanced mode of operation, also to be defined, it has been necessary to write special software drivers for the MacIntosh line of computers, with which the device is being tested, to communicate with the device 10. Most of the drivers have been created by writing external commands and functions for Apple Computer's object oriented authoring environment, the Hypercard program. These external code segments may be linked to Hypercard documents (commonly called stacks) and may be called by name from the Hypercard scripting language, Hypertalk. When called, the code segments will either (a) patch, as in the case of use with the MacIntosh Plus, or (b) bypass, as in the case of use with the Apple desktop bus, with existing keyboard drivers, communicating directly with devices connected to the computer's keyboard interface. The code segments are written to be as transparent as possible, so as not to disable or confuse the keyboard, which is, as defined above, connected in line with such devices.

It is to be noted that the versatility of such a device 10 can be greatly increased by providing "desk accessories" for same. One such access program has been written to read and write the various registers of the device 10 and send trigger commands to the device 10 at specific time intervals. Such an accessory is useful in situations where it is desired to take measurements at specific intervals over a long period of time with the measurement equipment being maintained unattended.

For instance, if a spreadsheet is open while the trigger commands are being sent, measured values will be "typed" into the spreadsheet at regular intervals, even if no operator is present.

Further enhancements to such an accessory may be proposed which will allow a variety of data collection and storage funtions to be performed while the user is doing something completely different with the computer, as well.

The digital and output registers 74LS75-1 and 74LS75-2 as noted above, are connected to the 6518 by the PIA bus, a bi-directional data bus. Although this may be considered a conventional concept frequently used in computer circuits, it bears discussion here since it is used in several different modes.

Figure 13:
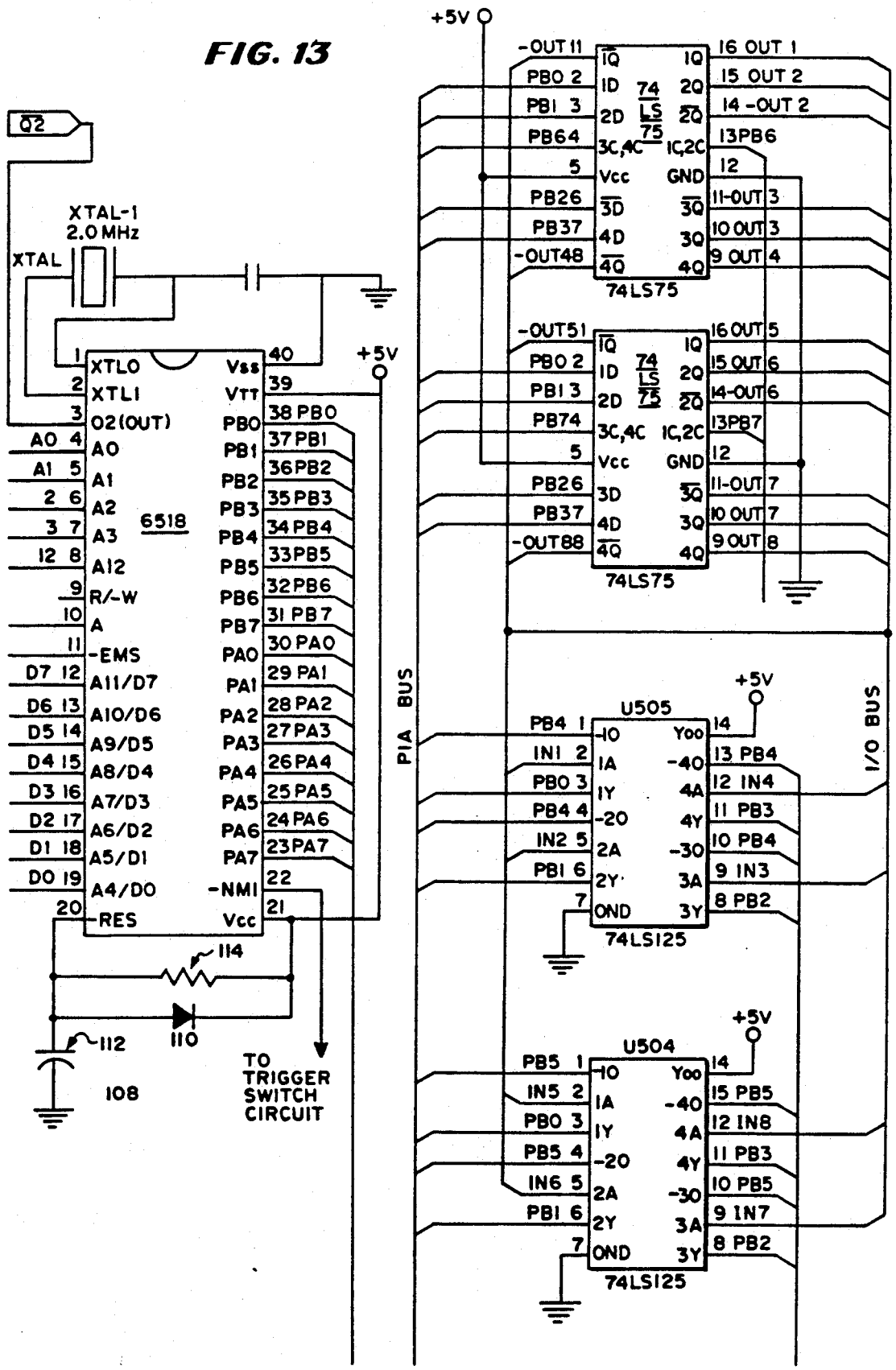
FIG. 13 is a circuit diagram showing the interconnections between the microprocessor and the digital input and output registers of the device of FIG. 1.

As illustrated in FIG. 13, a bi-directional dataline typically consists of a conductor pulled up to a positive supply voltage by one or more pullup resistors. The logic state of this line can be sensed by any and all devices connected to the line and can be changed, ie, pulled low, by any or all of the devices as well. Data transmitted on the line by any device can be sensed by any other device. The direction in which the data flows over the bi-directional data bus line is determined by which device has requested access of the line. Obviously, if two devices are requesting access to the same line simultaneously, malfunctions can occur.

In the case of the digital interface registers defined above, four bi-directional lines are used along with four control lines to prevent such malfunctions.

In the case where the device 10 has been used with the MacIntosh Plus keyboard interface, the CPU always initiates a command first, such command always being followed by a keyboard's response. Since each waits for the other, collisions are prevented in this manner.

In the case where the device 10 is used with the Apple desktop bus, the CPU generates a command first and then waits for further input from the various input devices. In this case, each input device is given a unique address by the CPU to prevent collisions.

FIG. 16 comprises a logic flow diagram setting forth the single slope A/D conversion algorithm utilized in the device 10 of the present invention. The steps which are taken may be defined as follows:

Step 1 An input to be converted is first of all selected and is then directed to a comparator.

Step 2. The question is asked is the comparator false. If a true reading comes back then the program circles around again and continues searching for an input which will provide an answer of yes to the comparator false question. There is a possibility during the time that the comparator is not false that a timeout will occur at Step 2A.

Step 2A. Such occurrence of a timeout will indicate that the input is above a predetermined range which is acceptable within the logic of the program.

Step 3. If, on the other hand, the answer to the comparator false question generated is a yes, the logic next questions whether the comparator is true. Once again, if the answer to the question of comparator true is no, the program circles around again and continues searching until it obtains an answer of yes to that question.

Step 3A. Here again, a timeout may occur during the period when the answer to the question is the comparator true is no, when the comparator is false, indicating that an input is below a range required by the logic of the program.

Step 4. Once an input is obtained wherein the answer to the comparator true question is a yes, the program then starts a forty thousand (40,000) microsecond countdown timer.

Step 5. At the same time or immediately thereafter, another question is generated as to whether the comparator is false. Here, if the answer appears as a no, the program circles around again as many times as necessary looking for an input which will provide an answer of yes to the question is the comparator false.

Step 5A. During the period that the comparator false question is receiving an answer of no, indicating that the comparator is true, a timeout may take place which will indicate that the input is above the range required for carrying out the program logic sequence.

Step 6. Once the question is the comparator false generates an answer of yes with the input it is receiving, the timer is stopped and read.

Step 7. The time that is locked into the timer is divided by eight (8) to provide a conversion into millivolts.

Such converted response generated by Step 7, in millivolts, is then saved in scratch pad RAM 6200 before further processing.

Defined more simply, the figure sets forth an algorithm which is used by the 6518 to convert the pulse width output of the window comparator 300 into a digital representation of the measured voltage. First an analog input is selected using the analog input selector 7000. The 6518 then waits for the comparator 300 to be false. This prevents the 6518 from starting to time a pulse in the middle of a conversion cycle. If the 6518 times out during this time period, it means that a true pulse lasted longer than expected and that the A/D input voltage is above the nominal range.

The 6518 then waits for the comparator 300 to go true indicating the point at which the linear ramp thereof crosses zero volts. If the controller times out during this time period, it indicates that the window comparator 300 is being held false by an A/D input below the nominal range, that is, below zero. As soon as a zero crossing is indicated, a countdown timer set for forty thousand (40,000) microseconds is started. This particular time interval has been chosen for the algorithm because it utilizes most of the resolution available in a sixteen (16) bit counter/timer with the maximum number of counts being 65,535, and because the binary result can be easily divided by four (rotated 2 bits to the right) to give a range of zero to ten volts in one millivolt increments or, on the other hand, may be divided by eight (rotated 3 bits to the right) to give a range of zero to five volts in one millivolt increments. The 6518 now waits for the comparator 300 to go false again. If this takes longer than expected, the A/D input voltage is defined as being above the nominal range. Otherwise, the value in the counter/timer is read and divided (by 4 or by 8) to get a binary integer showing the number of millivolts above zero present at the A/D input.

MACINTOSH II

Figure 17A:
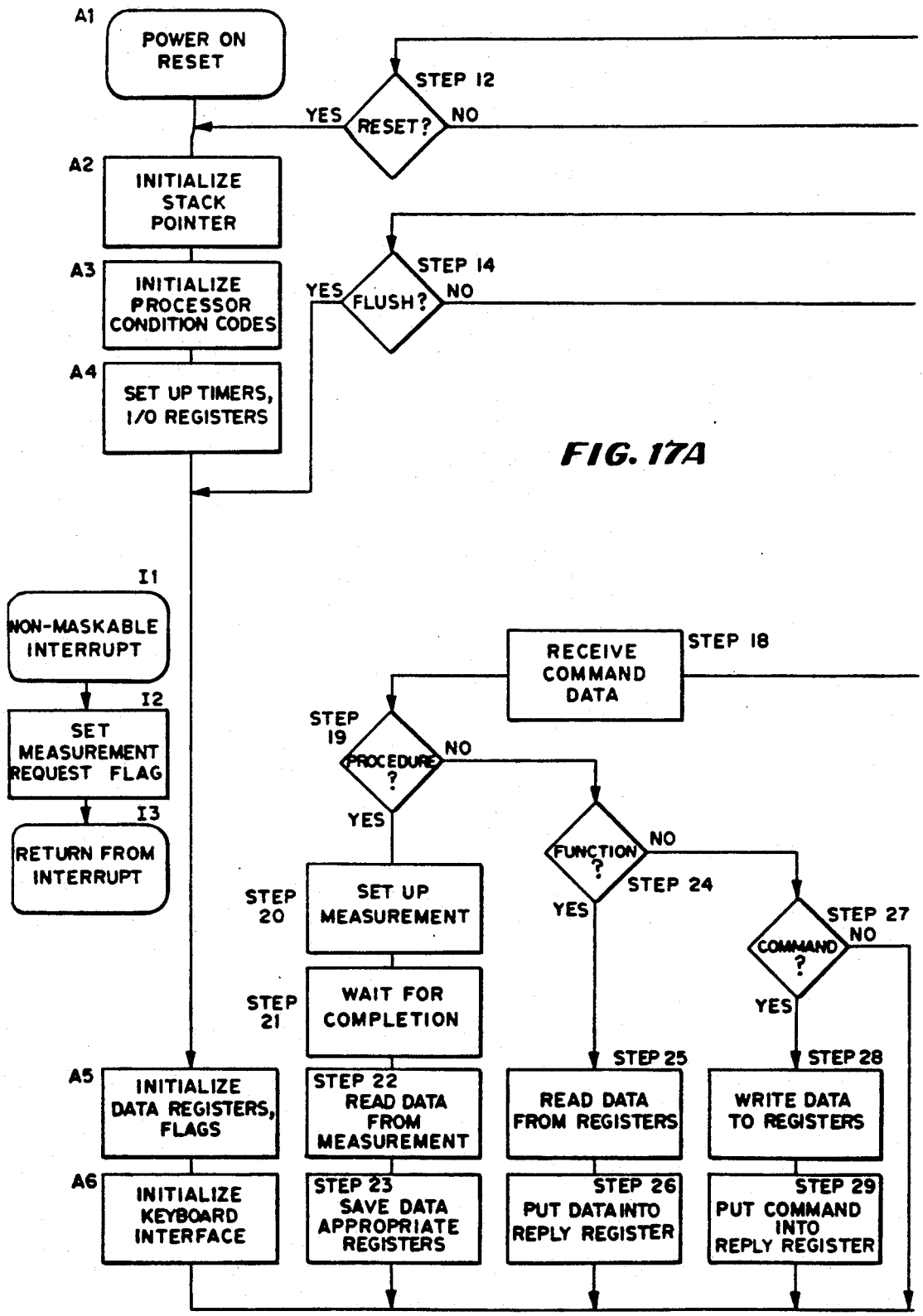
FIGS. 17A and B set forth a logic flow diagram of the steps carried out by the microprocessor of the device during a complete cycle of processing information received when the information is to be converted and transmitted to an Apple DeskTop Bus. (A product of Apple Computer Inc. of Cupertino, Calif.)
Figure 17B:
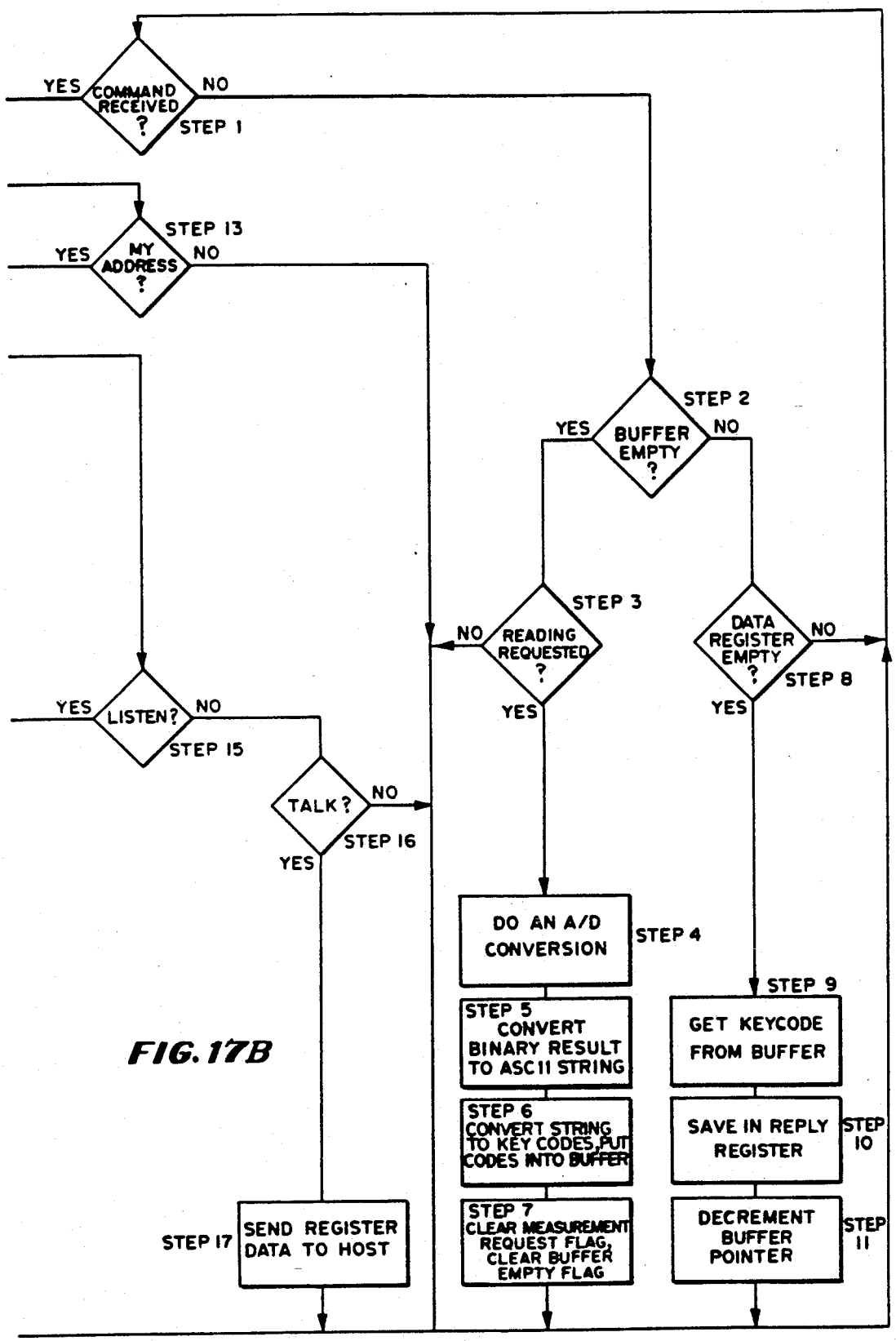

Referring now to FIGS. 17A and B, a flow chart of the logic steps which are programmed into the device 10 when the bridge device 10 is proposed for use with an Apple DeskTop Bus is set forth. The logic diagram includes several steps, each of which will be:

Step 1. The logic of the 6518 of the device 10 first of all questions whether a command has been received. If the answer to this question is no, the logic proceeds to Step 2.

Step 2. The logic next questions whether the buffer of the 6518 is empty. If the answer to this question is yes'- the logic moves on to Step 3.

Step 3. The logic next questions whether a reading has been requested. If no reading has been requested, the logic circles back around to Step 1. If on the other hand, the answer to this question is yes, the logic proceeds to Step 4.

Step 4. If a reading has been requested, then the input from such reading is converted to a digital form by the performance of an A/D conversion, as defined in connection with the description of FIG. 16. The logic proceeds to Step 5.

Step 5. The converted digital reading is now a binary result and such binary result is translated into an ASCII character string, in a manner which will be defined in connection with the description of FIG. 19. The logic proceeds to Step 6.

Step 6. The logic then converts the string of ASCII characters into key codes which are acceptable to the CPU of the computer incorporating the Apple Desk-Top Bus. These key codes are stored in a buffer and the logic then proceeds to Step 7.

Step 7. In this step, a measurement request flag is cleared and a buffer empty flag is cleared. At this point, the logic proceeds around again to Step 1 defined above.

Returning now to the question of is the buffer empty in Step 2, if the answer is no, the logic proceeds to Step 8 instead of Step 3.

Step 8. Here the logic questions whether the data register of the device 10 is empty. If the answer is no to this question, the logic circles back around to Step 1 defined above. If on the other hand, the answer to such question is a yes, the logic proceeds to Step 9.

Step 9. In this step, the logic obtains a key code from the buffer and then proceeds to Step 10.

Step 10. The key code which has just been obtained from the buffer, is now saved in a reply register and the logic proceeds to Step 11.

Step 11. At this point, the logic decrements a buffer pointer. Once this has been accomplished, the logic circles around to Step 1.

This process concludes the logic sequence when the answer to the question at Step 1 has a command been received is no.

Returning now to Step 1, when the answer to the question is yes (command has been received), the logic proceeds to the Step 12 instead of Step 2.

Step 12. The logic requests information with regard to whether a reset has been requested. If the answer to this question is yes, the program returns to a Reset Step of a power up procedure to be defined hereinafter. If the answer to the reset question is no, the logic proceeds to Step 13.

Step 13. At this step, the logic asks whether the bus address of the device 10 has been requested. If the answer to this question is no, the logic circles back around to Step 1. If, on the other hand, the answer to the question is yes, the program moves on to Step 14.

Step 14. The logic then asks whether there has been a flush requested. If the answer is yes, then the logic proceeds to prior steps of the power up procedure to be defined below wherein data registers and flags are initialized and a keyboard interface is initialized. After these two tasks have been completed, the logic circles back around to Step 1. If, on the other hand, the question of whether a flush has been requested is no, the logic continues to Step 15.

Step 15. The logic asks whether it should listen. If the answer to this question is no, the logic proceeds to Step 16.

Step 16. Here the logic questions whether it is to talk. If the answer to this question is no, then the logic circles back around to Step 1. If, on the other hand, the answer to this question is yes, the logic proceeds to Step 17.

Step 17. Here the logic sends the register data to the host, in this example, via the Apple DeskTop Bus. After it has completed sending the data to the host computer, the logic circles back to Step 1. Returning now to Step 15 where the logic questions whether it has been requested to listen, if the answer to this question is yes, the logic proceeds to Step 18 instead of Step 16.

Step 18. At this point the logic receives command data as will be defined in connection with the description of the commands utilized within this procedure hereinafter. Once the command data has been received, the logic continues to Step 19.

Step 19. In this step, the logic questions whether a procedure is to take place. If the answer to this question is yes, then the logic proceeds to Step 20.

Step 20. Here the logic sets up the desired measurement and proceeds to step 21.

Step 21. Here the logic waits for completion of the measurement set up and then proceeds to Step 22.

Step 22. The logic then reads the data obtained from the measurement and proceeds to Step 23.

Step 23. The logic then saves the data in the appropriate registers as defined hereinbefore. Once the data has been accumulated and saved to the appropriate registers, the program once again circles around the Step 1.

Returning now to Step 19 where the logic questions whether a procedure is requested, if the answer to such question is no, the logic takes another route, moving on to Step 24 rather than Step 20.

Step 24. The logic questions whether a function is required. If the answer to the function question is yes, the logic moves on the Step 25.

Step 25. Here the data from the registers is read by the logic.

Step 26. Now the data that has been read from the registers is placed into a reply register. Once this data has been placed into a reply register, the logic circles back around to Step 1.

If, on the other hand, at Step 24, the question of whether a function has been requested is answered with a no, the logic proceeds to Step 27 instead of Step 25.

Step 27. At this point, the logic questions whether a command has been received. If the answer is no, the logic circles back around to Step 1. If on the other hand, the question is answered with a yes, the logic proceeds to Step 28.

Step 28. At this point, the command data is written to the appropriate registers.

Step 29. Here, the logic proceeds to place a command reply into the reply register. After this has been completed, the logic at this point circles around to Step 1.

As is common with almost all logic systems, there are always initialization steps which take place within the flow of logic when power is supplied to the circuitry thereof. In this particular case, the initialization logic path includes the following:

Step A1. The system is powered on and all logic levels, etc. are reset.

Step A2. Here the logic initializes the stack pointer.

Step A3. The 6518 condition codes are initialized at this point.

Step A4. The timers and input and output registers are set up by the logic.

Step A5. The data registers and flags are initialized by the system.

Step A6. The keyboard interface is initialized.

Such initialization steps are common to many logic system and are accessed, as described below, in sections, at other points during the processing of the logic.

For example, when the question has a flush been requested, at Step 14 is answered with a yes, then Steps A5 and A6 are carried out again and the logic at that point returns to Step 1.

Also, at Step 12, where the question, has a reset been requested, is answered with a yes, Steps A2 thru A6 are repeated and the logic once again returns to Step 1.

It will be understood, that at any time during processing of this flow of logic, a nonmaskable interrupt can be generated. This nonmaskable interrupt (NMI) is shown as a subroutine and includes three steps. The first Step, I1, is receipt of an instruction that a nonmaskable interrupt has taken place. At this point, the program proceeds to Step I2 at which point a measurement request flag is set (see Step 20 above). Once the request flag is set, the subroutine proceeds to Step I3 which is a return from the interrupt. This NMI procedure has been defined in great detail hereinabove.

Figure 18B:
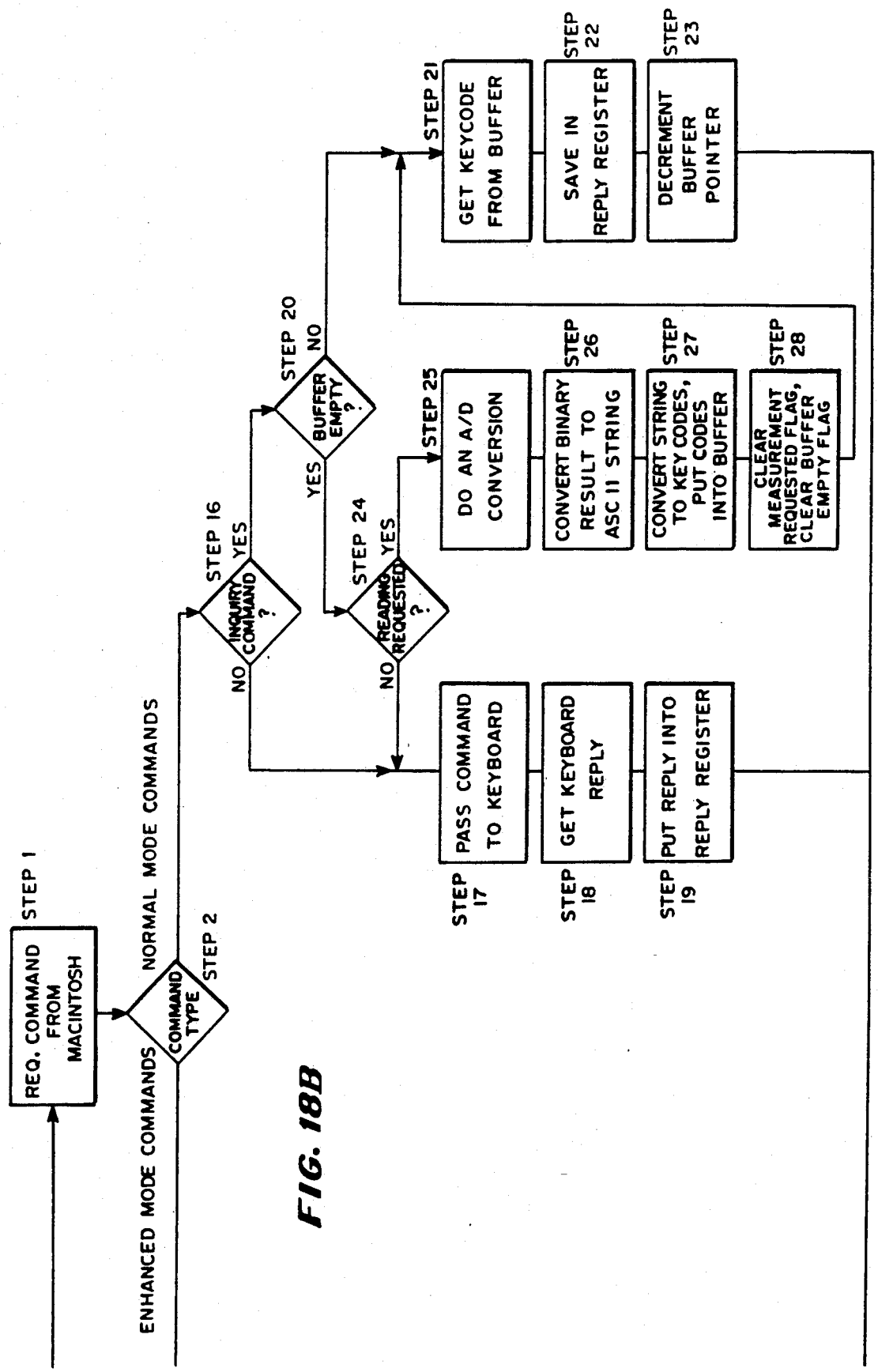
FIGS. 18A and B set forth a logic flow diagram of the steps carried out by the microprocessor of the device during a complete cycle of processing information received when the information is to be converted and transmitted to a MacIntosh Plus CPU. (A product of Apple Computer Inc. of Cupertino, Calif.)

Referring now to FIGS. 18A and B, there is defined therein a flow chart of the logic steps which take place within the 6518 when the device 10 of the present invention is utilized with a MacIntosh Plus computer.

As first of all will be seen, many of the steps here are similar to, if not identical to, the steps set forth in FIGS. 17A and B. For instance, the power up sequence which was defined in connection with the description of Steps A1 through A6 is identical in this flow chart and therefore will not be defined herein.

Further, there is here duplicated a subroutine for the nonmaskable interrupt, (NMI) which is identical to the routine for the nonmaskable interrupt defined with respect to FIG. 17A and this also will not be repeated.

The steps within the main logic flow chart, however, are somewhat different, and are described in stepwise manner as follows:

Step 1. The 6518 logic first of all receives a command from the MacIntosh as defined hereinabove.

Step 2. Once a command has been received, the logic identifies the type of command. In this respect, if the command is of the enhanced mode as defined above, one distinct set of logic steps is followed. On the other hand, if the type of command received is a normal mode command, then a second distinct set of steps is followed. Proceeding first through the logic steps when an enhanced mode command is received, the logic proceeds to Step 3.

Step 3. The logic questions whether a procedure has been requested. If a procedure has been requested, the logic then proceeds to Step 4.

Step 4. The logic sets up the procedure requested.

Step 5. During Step 5 the logic waits for completion of the measurement.

Step 6. Here the measurement data is read.

Step 7. The measurement data is saved to the appropriate registers. At this point, the logic proceeds to Step 8 which is accessed upon several occasions within the logic flow.

Step 8. A reply is sent back to the CPU, such reply defined hereinabove. At this point, the logic returns to Step 1 and begins once again.

Returning now to Step 3, if the answer to the question has a procedure been requested is no, the logic proceeds to Step 9 instead of Step 4.

Step 9. The logic questions whether a function has been requested. If the answer to this question is yes, the logic proceeds to Step 10.

Step 10. The logic reads the data from the appropriate registers.

Step 11. The data that has been read is placed into the appropriate reply registers. Once this data has been placed into the reply registers, the logic circles back to Step 8 sending a reply to the CPU and then proceeds to Step 1.

Returning now to the question at Step 9 whether a function may have been requested, if the answer to this question is no, then the logic proceeds to Step 12.

Step 12. The logic inquires as to whether a command has been received, if the answer to this question is no, the logic proceeds to Step 13.

Step 13. A no reply is placed into the reply register. The logic then flows back to Step 8 where the no reply is sent to the CPU and the logic circles back to Step 1.

If on the other hand, the question of whether a command has been received at Step 12 is answered by a yes, then the logic proceeds to Step 14 instead of Step 13.

Step 14. At this step the logic writes the data to the appropriate registers.

Step 15. The logic places a command reply into the reply register and circles back to Step 8 where the reply is sent to the CPU and circles back to Step 1.

When the command type at Step 2 is found to be a normal mode command, as defined hereinabove, the logic steps that take place are as follows:

Step 16. Once the command type has been determined to be a normal mode command, the logic questions whether the command is an inquiry command. If the answer to this question is no, then the logic moves on to Step 17.

Step 17. The non-inquiry command is passed on to the keyboard.

Step 18. At this point the logic elicit a keyboard reply.

Step 19. The logic then places the keyboard reply into a reply register and returns to Step 8 where the reply is sent back to the CPU. The logic then circles once again to Step 1.

Returning now to the question at Step 16 of whether an inquiry command has been received, if the answer is yes, then the logic proceeds to Step 20.

Step 20. At this point the logic questions whether the buffer of the system is empty. If the answer to this question is no, then the logic proceeds to Step 21.

Step 21. At this point the logic obtains a key code from the buffer.

Step 22. This key code is saved to an appropriate reply register.

Step 23. A buffer pointer is decremented. At this point the reply saved in the register, as the logic returns to Step 8, is sent to the CPU, and once again the logic returns to Step 1.

If, at Step 20 the question of whether the buffer is empty is answered with a yes, then the logic proceeds to Step 24.

Step 24. The logic questions whether a reading has been requested. If no reading has been requested then the logic circles back thru Steps 17 - 19 passing a command to the keyboard, receiving a keyboard reply, and placing the reply into the reply register. The logic then proceeds to Step 8 sending the keyboard reply back to the CPU and then once again returns to Step 1.

If, on the other hand, a reading is requested at Step 24, the logic proceeds to Step 25.

Step 25. At this point, the reading is converted via A/D conversion to a binary form.

Step 26. Here the binary result of the conversion is translated into an ASCII character string.

Step 27. The ASCII character string is converted into key codes and the key codes placed into a buffer.

Step 28. At this point, the measurement request flag is cleared and the buffer empty flag is cleared.

Step 29. At this point, the logic circles back around thru Steps 21 - 23 and the logic proceeds to get the key code from the buffer, saves same in the reply register, and decrements the buffer pointer. Once again after these procedures take place, the logic circles back around to Step 8 where the reply from the reply register is sent to the CPU and then the logic circles back around to Step 1.

Figure 19:
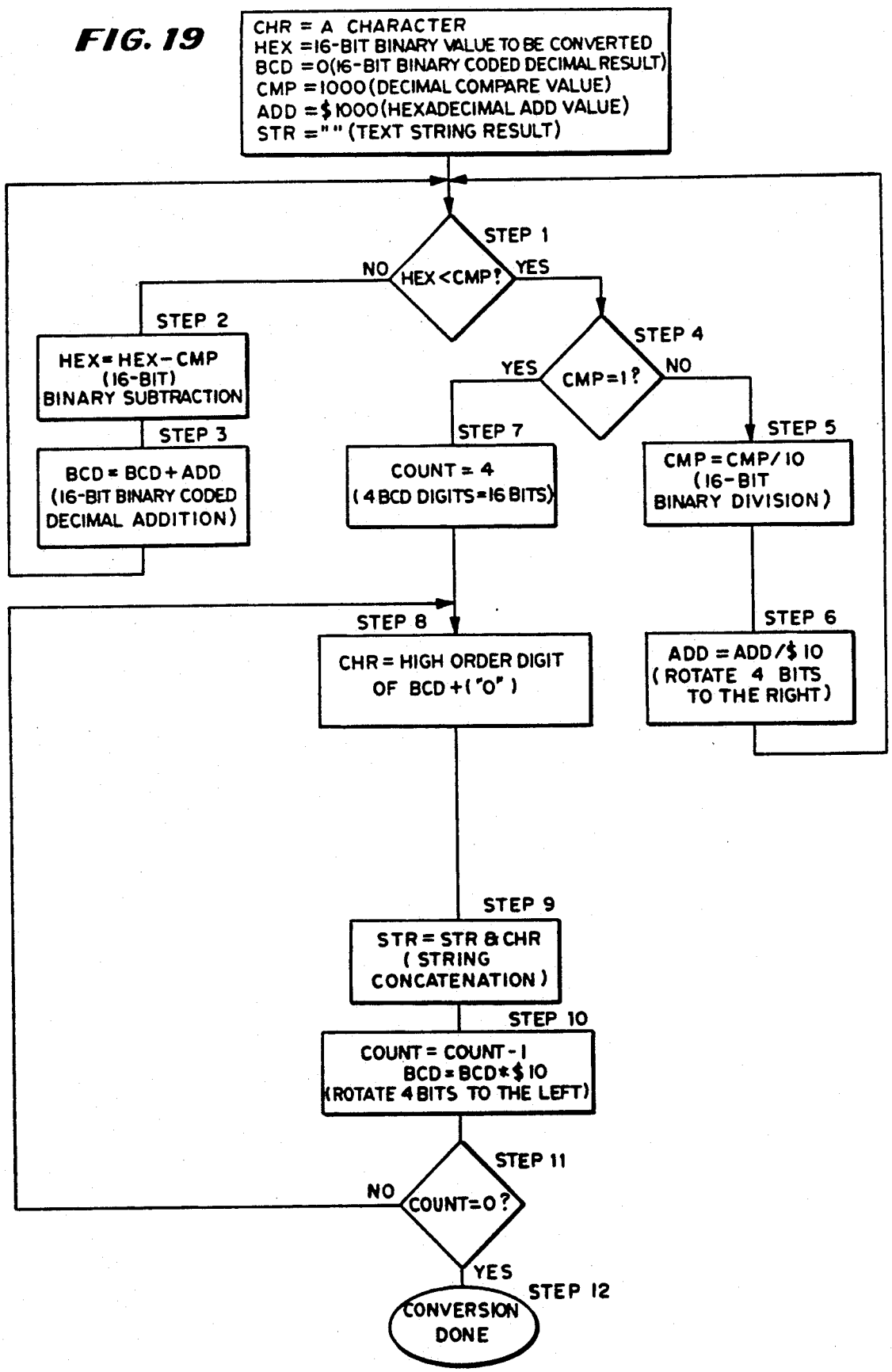
FIG. 19 is a logic flow diagram of an algorithm used by the microprocessor to convert a binary integer to a decimal text string which is output to a CPU of a computer with which the device is coupled.

In FIG. 19 there is set forth a flow chart of a Binary Integer to Decimal String Conversion Algorithm. In this algorithm, the acronymns utilized are defined as follows:

CHR = A character
HEX = 16-bit binary value to be converted
BCD = 0 (16-bit binary coded decimal result)
CMP = 1000. (decimal compare value)
ADD = $1000 (hexadecimal add value)
STR = (text string result)

Proceeding thru the logic steps followed:

Step 1. The question is asked whether HEX is less than CMP. If the answer to this question is no, then the algorithm proceeds to Step 2.

Step 2. HEX is set to be equal to HEX − CMP through a 16 bit binary subtraction. The algorithm then proceeds to Step 3.

Step 3. BCD is set equal to BCD + ADD through 16 bit binary coded decimal addition. At this point, the logic circles around again to Step 1 where it once again asks if HEX is less than CMP.

If or when the answer to the question at Step 1 is HEX less than CMP is yes, the logic proceeds to Step 4.

Step 4. The question is asked whether CMP equals 1. If the answer to this question is no, the logic then goes to Step 5

Step 5. CMP is set to equal CMP over 10 through a 16 bit binary division process. The logic then proceeds to Step 6.

Step 6. At this point, ADD is set equal to ADD over $10, with the value being rotated 4 bits to the right. At this point, the logic circles back around to Step 1 and once again the question is asked is HEX less than CMP.

Returning now to Step 4, if the answer to the question does CMP equal 1 is a yes, then the logic proceeds to Step 7.

Step 7. The COUNT is set equal to 4 with 4 BCD digits equaling 16 bits.

Step 8. CHR is then set to equal the high order digit of BCD plus ("0").

Step 9. The text string result is now set equal to the text string result and CHR. In other words, a string concatenation is performed. The logic then continues to Step 10.

Step 10. The COUNT is set equal to COUNT − 1 and the BCD is set equal to BCD × $10. In other words, the result is rotated 4 bits to the left.

Step 11. At this point the logic questions whether COUNT is equal to zero. If COUNT is equal to zero, then the logic proceeds to Step 12, and the conversion is completed.

If on the other hand the answer to does COUNT equal zero is no, then the logic flows back around to Step 8 where Steps 8 through 11 are repeated until a response to the question does COUNT equal zero is a yes, with the conversion being completed at that point, at Step 12.

FIG. 14 is a detailed schematic of the interface circuitry utilized to connect the device 10 to the Apple DeskTop Bus (ADB).

The ADB has a single bidirectional data line 412 which is connected to all configured devices. The device 10 monitors the state of this line through PA0 line 170. When the device 10 is addressed to "talk," it uses Q1001 to impress information on the ADB data line 412. Q1001 is controlled by PA1, through R1001. These are the only components needed to make the interface operational.

Transistors Q1002 and Q1003 form a pulse width stretching circuit with capacitor C1001 which lights indicator LED D1001 when the device 10 is sending data to the host CPU. When PA1 is driven high by the 6518, Q1001 is biased on, pulling the ADB data line 412 low, and Q1002 is biased on, charging C1001 rapidly through R1003. C1001 then discharges slowly through R1004, R1005, and the base of Q1003, causing current to flow through the LED D1001. The pulse stretching feature is needed, since data transmissions are usually too short to be easily seen in an indicator lamp activation.

Transistors Q1004 and Q1005 form a time delay circuit used to operate a relay which disconnects the ADB data line 412 from the device 10 if it is not powered. This is an important feature, since a non-powered device 10 will pull the data line low (through input protection clamping diode D601) causing the ADB to hang. When PA0 is high (as when the is powered up), Q1004 is biased off allowing C1002 to be charged through D1002 and R1009. This in turn biases Q1005 on, activating the reed relay 420 and connecting the device 10 to the ADB. If PA0 is low (as when the device 10 is powered down), Q1004 will be biased on, which will reverse bias D1002 and prevent C1002 from being charged. Q1005 will then be biased off, opening the reed relay and disconnecting the ADB. Normal data communications will cause PA0 line 170 to change state repeatedly C1002 however holds its charge over such interruptions, keeping the reed relay closed and maintaining continuity with the ADB data line 412.

Special commands, as stated above, are required when the device 10 is operating in the enhanced mode. These commands include the following:

Command 0 (Set measurement Request Flag)

Reads analog voltage at analog input channel 0, converts to keystroke sequence: X.XXX and field delimiter, and sends to Mac keyboard driver. Input range — 0.000 to 5.000 in 1 mv steps (1 in 5000 resolution). Above 5.000 reads "over". Below 0.000 reads "under". This is used primarily by desk accessory for automatic data input to application programs (Excel...) in real time.

Command 1 (Request A/D conversion)

Reads analog voltage at specified analog input channel from 0 to 7, converts to binary integer between 0 and 40,000. Divide the integer by 8 to get millivolts (from 0 to 5000), divide by 8000 to get volts (from 0.000 to 5.000). This mode provides more significant bits than command 0. However, if least significant bit is very noisy, the user must truncate.

Command 2 (Read digital inputs)

Reads the state of 8 digital input lines and returns them as one 8-bit byte of data. Inputs are LS/TTL (0–0.4 Vdc='0', 2.5–5.0 Vdc=1', do not exceed range from 0.0 to 5.0.)

Command 3 (Write digital outputs)

Writes an 8-bit byte of data to the digital output lines. Outputs are LS/TTL (0–0.4 Vdc='0'sink 20 mA max., 2.5–5.0 Vdc='1'source 1 mA max.)

Command 4 (Write/read delimiter characters)

Allows user to set ASCII characters which will be used as field and record delimiters. Note that some ASCII characters cannot be converted to key codes when using command 0.

Command 5 (Clear Event Counter)

Resets event counter to 0. (Maximum count is 65,535.)

Command 6 (Read Event Counter)

Returns 2 byte integer from 0 to 65,535 showing the number of pulses received by input PA 5. Maximum pulse rate is 500 kHz. No minimum pulse rate, but rise and fall times should be 10 usec or less.

Command 7 (Set asymmetrical pulse output parameters)

Sets PA 5 output with two 2-byte integers (total 4 bytes) to independently control pulse high time and low time. Maximum pulse interval — 131,070 microseconds (65,535 microseconds hi and 65,535 microseconds lo). The assymmetrical pulse output is filtered to derive the analog output voltage, which ranges from approximately 0.0 volts (at 0% duty cycle) to 5.0 volts (at 100% duty cycle).

Command 8 (Read pulse width on PA 4)

Used primarily for debugging. Will read pulse width from 0 to 65535 usec. on PA4. Returns value as 2 byte integer.

Command 9 (Read clocked pulse width on FA 4)

Used with weather station interface to read anemometer rate of rotation Returns 4 byte integer of microseconds for one revolution. Four (4) bytes could read up to 4,294,967,295 microseconds (about 71 minutes) but firmware currently times out at 5 seconds.

Command 10/11 (Read digital mulliplex inputs box #1/#2)

Scans multiplex inputs and returns result as four 8-bit bytes. Inputs are opto-isolated. Input LED's need from 10 mA to 20 mA to bias on. Forward voltage will be about 1.5 Vdc. Maximum reverse voltage=5.0 Vdc.

Command 12/13 (Write digital multiplex outputs box #1/#2)

Writes data bits to relay outputs. Reed relay's contacts are rated from 500 mA max, 100 Vdc max, 10 watt switched load max.

Weather Station Interface

Figure 21:
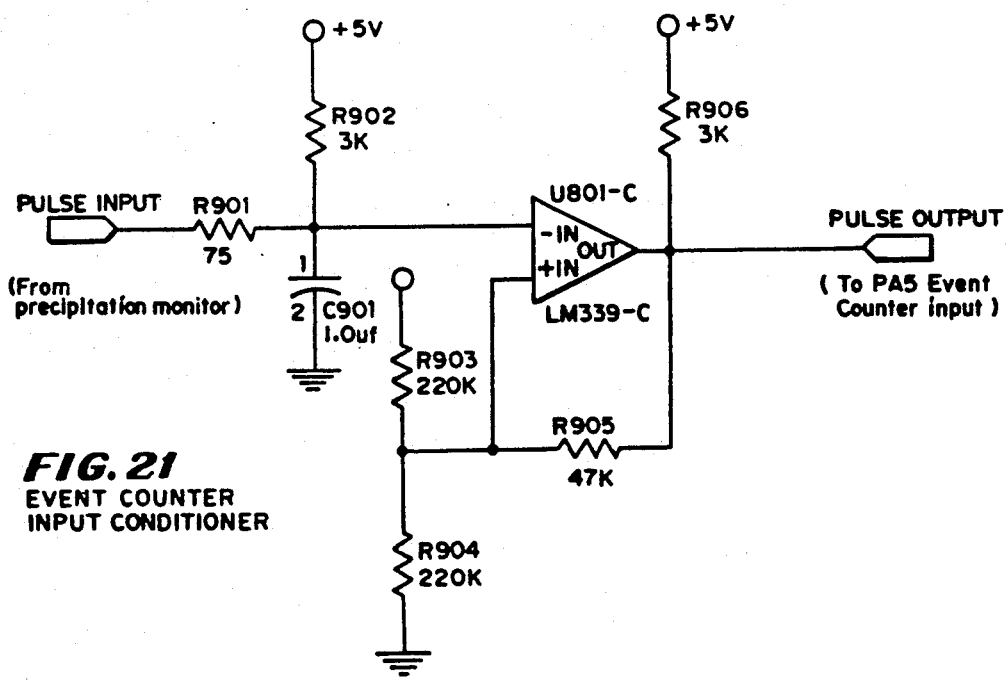
FIG. 21 depicts a schematic of out-board circuitry to permit a precipitation monitoring device to be hooked up to the device.

FIG. 21 depicts outboard peripheral circuitry which will allow connection of weather monitoring sensors to the device 10. FIG. 21 shows a detailed schematic of input conditioning circuitry used to interface a commercially available precipitation monitor to the event counter input, PA5. U801-C is a differential comparator with positive feedback applied by R905. The preciptation monitor provides a pulse signal (switch closure to ground) once for each 0.1 inches of rainfall. The event counter (part of microcontroller Ul) may be cleared and read with enhanced mode commands. PA5 may be used as either an event counter input, or as an asymmetrical pulse output, but not both at the same time.

Figure 22:
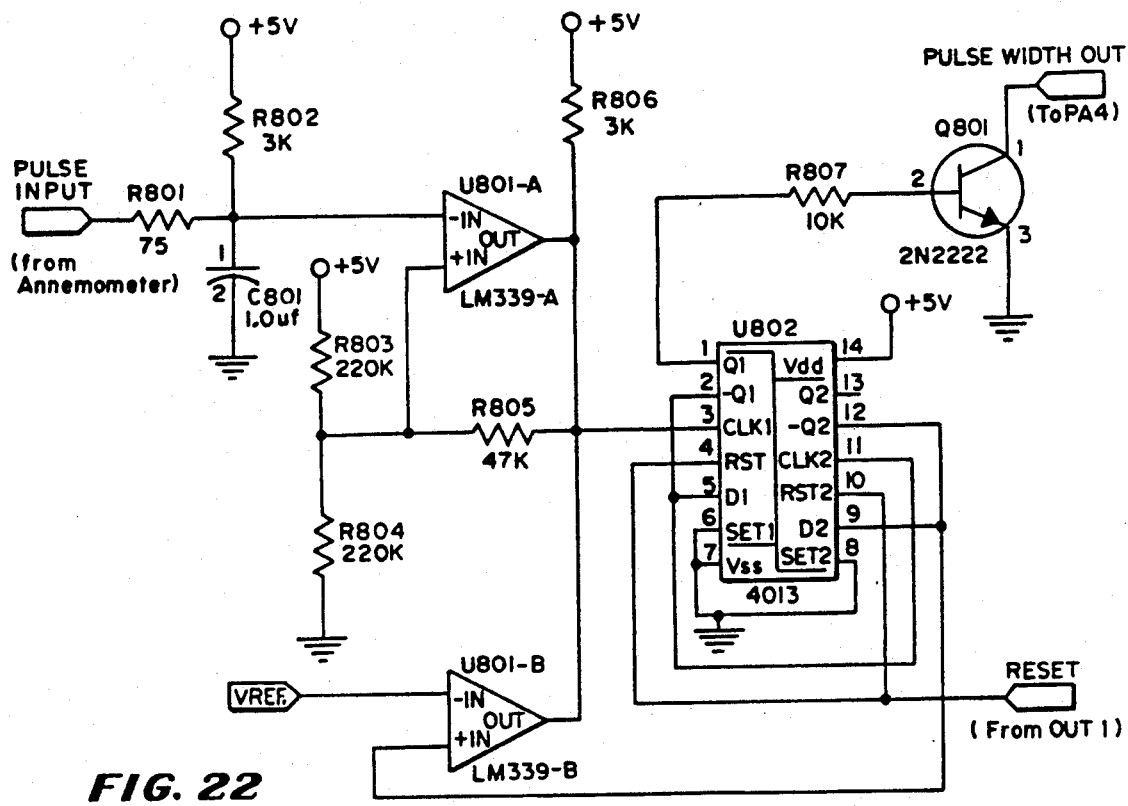
FIG. 22 depicts a schematic of out-board circuitty to permit an anemometer to be hooked up to the device.
Figure 24:
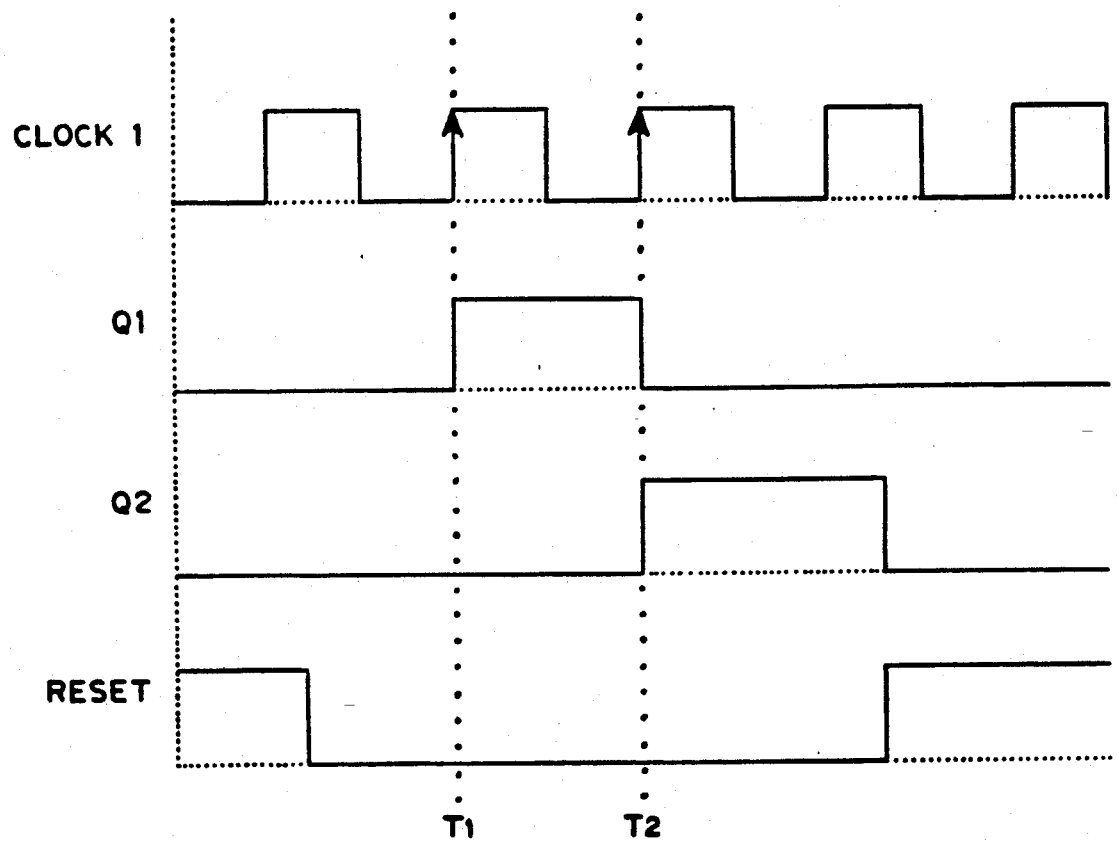
FIG. 24 is a timing diagram of the repetition rate to pulse width timing of a clock of the binary counter circuit of FIG. 22.

FIG. 22 shows a binary counter circuit specially configured to adapt a commercially available anemometer to the device 10. The anemometer produces one pulse (switch closure to ground) for each revolution of its vanes. Incoming pulses are cleaned up by U801-A (same configuration as FIG. 21) and then applied to the clock input of dual 'D' flip/flop U802. As shown in the timing diagram of FIG. 24, the first rising edge on Clock 1 after Reset is released and causes Q1 to go true. This signal is inverted by Q801 and begins a pulse width timing sequence in microcontroller Ul. The next rising edge on Clock 1 causes Q1 to go false, terminating the pulse width measurement sequence. Q2 goes true at the same time, causing U801-B's output to go low, inhibiting any further counting until another sequence is started. The pulse width measured by Ul will be equal to the time (in microseconds) required for one revolution of the anemometer. With suitable scaling and offset, this number can be converted into a very precise indication of wind speed. While microcontroller Ul's basic pulse width measurement capability is limited to pulses of 65 milliseconds duration or less, we use the provision made by Rockwell to allow counting of timer overflows. In this manner, repetition rates of any duration are accommodated. In the anemometer application, we typically terminate the measurement if pulses are more than ten seconds apart. This corresponds to a zero wind speed.

The External Bus For Device 10

Figure 23A:
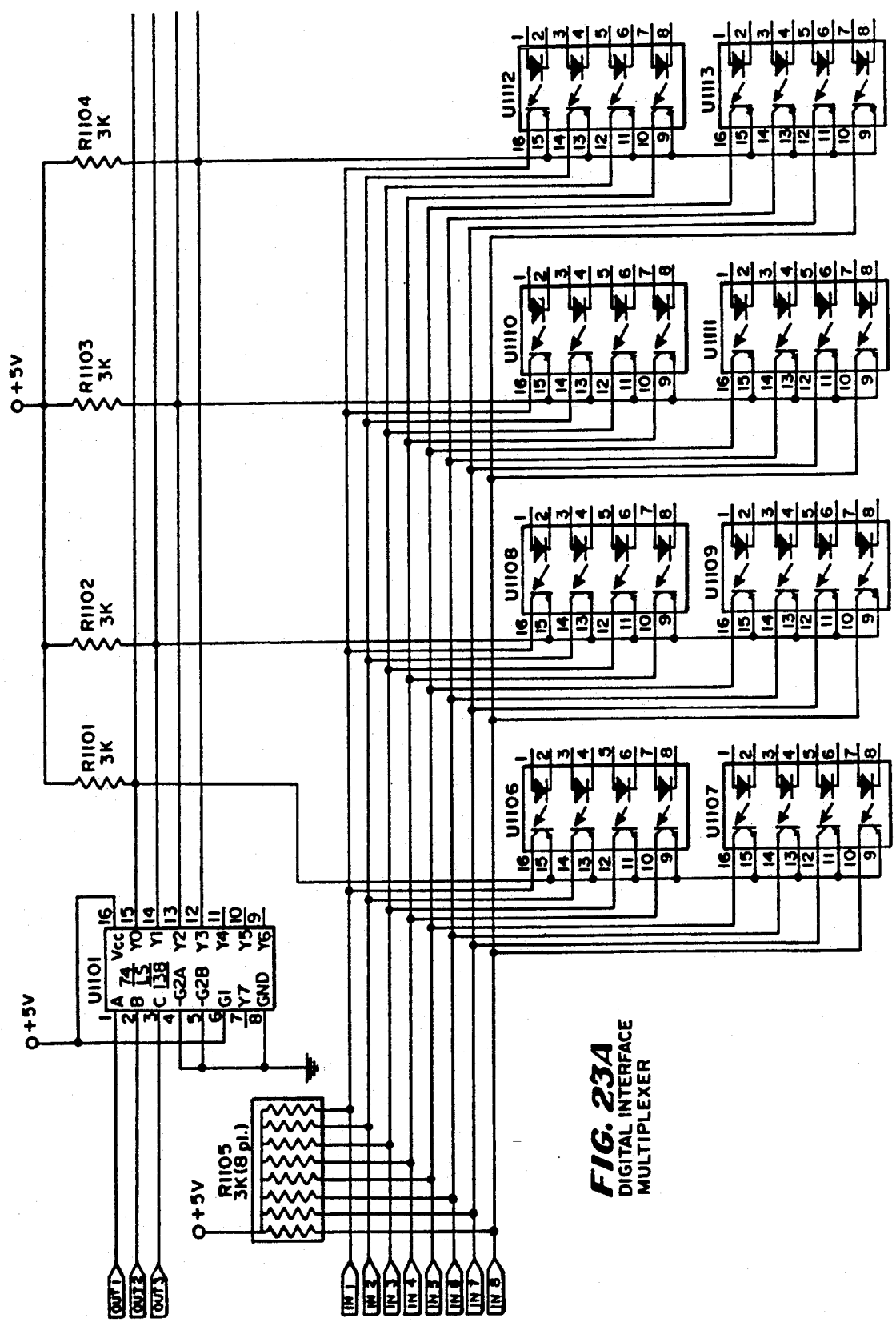
FIGS. 23A and B depict a schematic of the digital interface multiplexer used with the device.
Figure 23B:
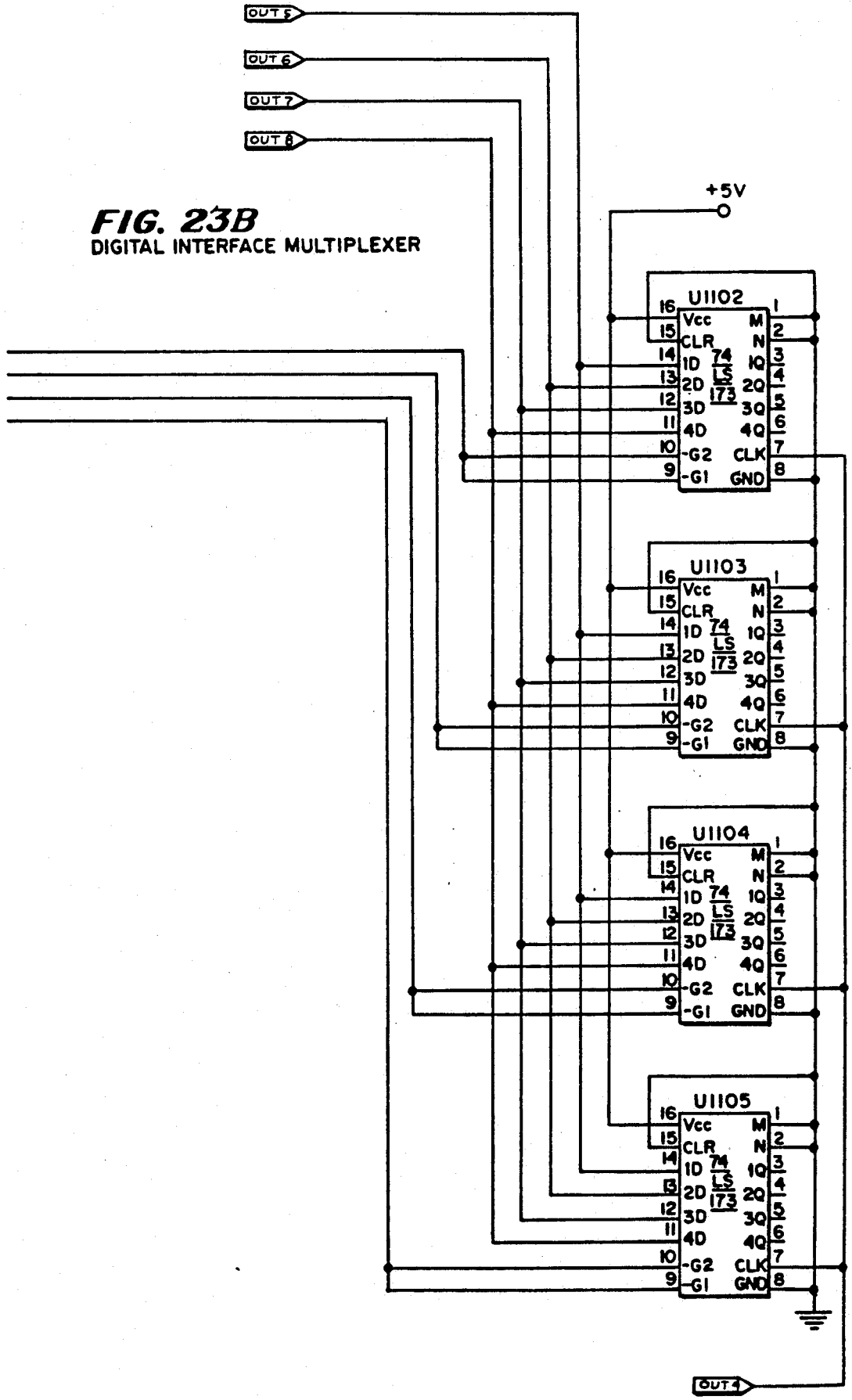

Further development work on the device 10 and certain application specific hardware, for instance, the Digital Interface Multiplexer of FIG. 23, has shown a need for more than one accessory device to operate with the device 10 simultaneously. For instance, the multiplexer could be used to control signals or equipment based on measured values returned by the Weather Station. It has been determined that the device 10, as previously documented, can support this type of operation, if certain definitions and conventions are observed in using the Digital Input and Output lines of the device 10.

For this purpose, a protocol for the Digital Ouput lines is defined. Lines 1, 2, and 3 are used as register select bits. Up to 8 registers can be connected at one time, each enabled by a specific 3 bit code. These registers may be connected in parallel and may be located in one or more accessory devices. Line 4 is defined as an output strobe. It is raised to a high or true level to clock external latch registers. Lines 5, 6, 7, and 8 are used as data output lines. Therefore, 8 external registers of 4 bits each result in a maximum of 32 latched lines in orie or more accessory devices per device 10. At present, we are planning to have 8 output bits in each of 2 Multiplexers requiring 16 bits, leaving 16 additional bits for other devices such as the Weather Station devices of FIG. 21 and FIG. 22.

Output lines 1, 2, and 3 are also used as input selectors. The output lines are set to one of 8 possible states, the selected external accessory presents data on the device 10's 8 input lines, and then the device 10 reads the input lines. Up to 8 input registers of 8 bits each (64 bits total) are possible for each device 10. It is desirable to have 8 input bits in each of 4 registers in each of 2 Multiplexers requiring all 64 bits.

Digital Interface Multiplexer

The circuit shown in FIG. 23 expands the device 10's basic eight input lines to 32, and increases the normal output lines from 8 to 16. These numbers are somewhat arbitary, since this technique can be expanded to allow even more inputs and outputs, as many as 64 input lines and 32 output lines per device 10. The additional capacity will make the device 10 suitable for use in the field of process monitoring and control, and in security and remote sensing applications. This hardware can be accessed by special enhanced mode functions and commands.

It is believed that the hardware and software concepts described herein provide a device 10 which may be coupled to any computer with a detachable keyboard, including IBM PC's, AT&T PC's, DEC PC'S (and their compatible equipment) as well as other available computers and terminals. In providing such a versatile device 10, with respect to its use with various computers, a broad range of applications for a such a device 10 has been identified.

Such applications, with the use of specific interfaces, may include, for example, use of the device with a weather station module, such weather station being able to read wind direction in the normal mode as defined above, and being able to read wind speed, precipitation and indoor/outdoor temperatures in the enhanced mode as defined above. It is possible to provide readings of barometric pressure, relative humidity and solar radiation parameters with the provision of further module devices.

Another use or application is in the development of a home security system which could provide a user with multiple alarm input loops and multiple alarm outputs. These functions could be controlled with the device being functional in the enhanced mode, with the presentation of a sophisticated program (which could be written in a language suitable for use with a particular computer and/or its programming) with such home security system being able to visually present status and alarm information. The user may even be able, under certain conditions, to establish various zone priority levels and to establish particular alarm actions which may depend on for example, the time of day, or other conditions.

Also, a multiplexed digital input/output accessory could be provided to produce an extremely enhanced security system which would be capable of determining the status of individual sensors in a business or home. This would allow a user to assign any sensor to any zone and to selectively enable and disable any sensor at any time.

Further, with the concern being shown for conservation of energy at the present time, the device 10, again with appropriate programming and interfaces, could be utilized to monitor and control commercial or residential energy usage, such as the heating and cooling thereof, could be utilized to monitor and control energy uses in the industrial world, and could further be provided for smaller household applications, such as: for the control of model train layouts, for use with an electronic breadboard device for educational purposes, for controlling audio and video entertainment equipment via a direct connect thereto or through infrared remote control, is utilized with appropriate signal conditioning circuits as a general purpose digital volt meter, could be operated with a strain gauge or equivalant to provide a recording bathroom scale (or in a smaller form, a postage scale), could be used with appropriate interfaces to control lawn and garden sprinkling systems, or even could be used, with appropriate sensors, to measure the ballistic velocity of projectiles.

With respect to industrial applications for the device 10, such applications could include electronic gauging, statistical quality control, punch press die protection and parts counting, molding machine temperature and pressure tracking, job control and order tracking (via bar codes or other methods of identification) as well as for a variety of other process monitoring and control applications.

Business uses might include audio and video production via remote and/or computer control of recording and playback equipment, sequencing of visual presentations such as slide shows or computer graphic displays via wired or wireless remote control and, remote keyboard/keypad applications as might be used in training, or in multiuser environments. The device 10 might also be utilized to connect a variety of nonkeyboard input and identification devices to desktop computers, such as security and bank card readers, bar code readers, radio frequency band readers and optical character recognition devices.

In summary, it will be noted that the device 10 of the present invention has a number of advantages, some of which have been described above and others of which are inherent in the invention.

Further, as disclosed in the vast range of uses to which the device 10 could be put, many modifications could be made to the device 10 without departing from the teachings of the present invention. Accordingly, the invention is only to be limited as necessitated by the accompanying claims.

As can be seen, this particular device 10 has a wide variety of applications. It can be used to record information from a weather station module. It can also be used to control various modules by receiving information from the computer through the interface to the control modules. This makes information available to various sources and permits running of manufacturing process among other uses.

It is clear that this device may have a power source separate from a computer. It may also be attached to a battery powered computer and be battery powered itself to make it highly suitable for field uses. Typical field uses relate to geological matters and to military matters.

Also very typical is that a plurality of devices 10 may be used as sensors for a sprinkler system, for instance a fire prevention sprinkler system. The sensors may determine where the sprinkler is that went off. It may also determine an area getting hot before the sprinklers do go off. In this fashion, great advantages of sprinkler controls can be obtained. Such computer checks of sprinkler systems will provide greater safety and control.

Additionally, a vehicle may be monitored from the portability aspect of the invention. This particular invention of device 10 can monitor a vehicle and make it extremely efficient in running and add greatly to the pollution free environment.

This particular device can also run multiple modules and provide for greatly simplified uses in manufacturing and other processes. Accordingly, the development of this particular device has provided a major asset for the industry.

This application —— taken as a whole with the specification, claims, abstract, and drawings —— provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A peripheral data acquisition, transmission and control device which is connected between a central processor of a computer and a keyboard thereof for receiving data, such as measurement data, translating said data into code accepted by the central processor and outputting said data in a manner emulating keystrokes to said central processor, said device including:
   signal receiving means for receiving signals indicative of any alphabetical, numerical, and control input which can be created on a keyboard;
   a microprocessor programmed to translate said received signals into keyboard code signals and having an input thereof connected to an output of said signal receiving means
   signal output means connected to an output of said microprocessor for sending the translated code signals to the central processor of the computer; said signal receiving means and said signal output means comprising a bidirectional data line and; discrete connector elements for connecting said device to said keyboard and to said central processor.

2. The device of claim 1 being connected to relay switches or other circuit devices for controlling the function of peripheral equipment coupled to an output thereof.

3. The device of claim 2 including special driver software which patches the software of the computer program being utilized, such special driver software trapping incoming response codes, converting them into a format used by the calling software program and returning those values to the calling program.

4. The device of claim 1 including a feedthrough circuit for connecting a power circuit of a keyboard attached to said device to the power circuit of said computer.

5. The device of claim 1 including two modes of operation.

6. The device of claim 5 wherein a first mode of operation is a normal mode, wherein a user of the device has control thereover.

7. The device of claim 5 wherein a second mode of operation is an enhanced mode, wherein the device is self-controlled by a software program.

8. The device of claim 1 including a single chip microprocessor.

9. The device of claim 8 wherein said microprocessor includes a central processor, a random access memory and a read only memory accessible to said central processor, said central processor also being engaged to a clock oscillator controller circuit, at least one interface register and at least one discrete output.

10. The device of claim 9 further including a keyboard interface circuit.

11. The device of claim 10 wherein an eight channel digital input register and an eight channel digital output register are provided and electrically engaged to said microprocessor.

12. The device of claim 11 wherein said input and output registers interact with said interface register counter/timers, thereby providing input to the registers as well as output from the registers.

13. The device of claim 12 further including a digital to analog conversion circuit.

14. The device of claim 13 including an analog input selector which feeds its output to an analog to digital conversion circuit which further feeds a pulse width counter input.

15. The device of claim 14 wherein said pulse width counter output is shunted to the interface register counter/timer.

16. The device of claim 15 wherein an integrated circuit is provided which divides a main clock signal down to a low frequency signal.

17. In combination with a computer and a keyboard, said computer and said keyboard having respective port means, including respective connector means which, when mated together, provide for engagement of said computer and said keyboard that enables said keyboard to provide alphabetical, numerical, and control data and commands to said computer, a peripheral data acquisition, transmission and control device, said device comprising its own port means, including its own connector means, said connector means of said device comprising first means mated with the respective connector means of said computer and said keyboard such that the engagement of said computer and said keyboard is through said device, and second means connected to a source of data other than said keyboard which provides data signals to said device in a format other than the format of signals that said computer will accept from said keyboard, said device comprising translating means for translating said signals from said source into the same format as that of said signals from said keyboard and transmitting means for transmitting the translated signals to said computer via that portion of said first means which provides for the connection of said computer with said device.

18. The device of claim 3 including a single slope analog to digital conversion circuit.

19. The device of claim 18 wherein said single slope analog to digital conversion circuit includes a free running linear ramp generator and a window comparator with an enable input.

20. The device of claim 19 wherein the window comparator is implemented with two comparators, the comparator outputs being connected together in wired-or fashion and pulled up by a resistor.

21. The device of claim 20 wherein said linear ramp generator is implemented with a dual JFET operational amplifier, a quad comparator and a PNP bipolar transistor.

22. The device of claim 21 wherein the output of said window comparator is disabled during ramp reset.

23. The device of claim 22 wherein said linear ramp generator may serve multiple comparators within the device.

24. The device of claim 23 including an analog input conditioning circuit.

25. The device of claim 24 including a PNP bipolar transistor for cutting power supply noise and ripple during the measurement cycle.

26. The device of claim 25 including a diode/resistor circuit to prevent a latchup condition such as would occur when power is supplied to the circuit.

27. A peripheral data acquisition, transmission and control device which is connected between a central processor of a computer and a detached keyboard thereof for receiving data, such as measurement data, translating said data into code acceptable to a central processor of the computer and outputting said data to said central processor in a manner emulating keystrokes accepted by said central processor, said device including:

signal receiving means for receiving signals indicative of any alphabetical, numerical, and control input created on a keyboard;

a programmable single chip microprocessor including a central processor, a random access memory and a read only memory accessible to said central processor, said central processor also being engaged to a clock oscillator controller circuit, at least one interface register and at least one discrete output and having an input thereof connected to an output of said signal receiving means, said microprocessor being programmed to translate said received signals into computer oriented keyboard code signals accepted by the central processor of the computer;

signal output means connected to an output of said microprocessor for sending the translated code signals to the central processor of the computer, said signal receiving means and said signal output means comprising a bidirectional data line;

a digital input register and a digital output register electrically engaged to said microprocessor, said input and output registers interacting with interface register counter/timers, thereby providing input to the registers as well as output from the registers;

an analog to digital conversion circuit;

an analog input selector which feeds its output to said analog to digital conversion circuit which further feeds a pulse width counter input, said pulse width counter output being shunted to the interface register counter/timers;

an integrated circuit which divides a main clock signal down to a low frequency signal which is amplified by amplifier means and provided to the operational amplifier negative supply pin; and a keyboard interface circuit.

28. The device of claim 27 wherein said read only memory of said microprocessor sets up all internal registers and resets external registers contained in a parallel output circuit.

29. The device of claim 28 wherein said microprocessor further includes an external memory buffer through which data and program instructions from the read only memory are transferred thereto.

30. The device of claim 29 wherein said external memory buffer is multiplexed by way of at least one latch.

31. The device of claim 30 wherein said quad latch includes a resistor/capacitor reset circuit.

32. The device of claim 31 wherein said reset circuit further includes a diode to speed up response when power is removed from the circuit.

33. The device of claim 32 including a nonmaskable interrupt which is actuated by an external switch to signal the single chip microprocessor to take a reading to be sent to the keyboard interface.

34. The device of claim 33 further including an inverter, said inverter providing an enabling signal to be provided to an EPROM of the device.

35. The device of claim 34 including four integrated circuits constituting input and output registers of the device.

36. The device of claim 35 wherein said four integrated circuits expand the eight data lines to eight separate inputs and eight separate outputs.

37. The device of claim 36 wherein said four input circuits comprise two gated input or tristate buffers and two output latches.

38. The device of claim 37 wherein each output latch is a quad latch with both inverted and noninverted outputs.

39. The device of claim 38 wherein said single chip microprocessor executes a preprogrammed algorithm for enabling each of the support chips of its internal architecture to selectively clear any of the output lines and to selectively read any of the input lines.

40. The device of claim 39 including an output filter which receives a pulse width modulated signal on the input line, such signal being variable in duty cycle and pulse repetition rate.

41. The device of claim 40 wherein said variations in duty cycle appear as variations in DC voltage at the output of the integrated circuit filter formed by an operational amplifier.

42. The device of claim 41 including two transistor inverters for serial receive and serial transmit within the device.

43. The device of claim 42 including a serial interface shift register connected to two input lines for entering serial commands and for receiving serial data from the single chip microprocessor.

44. The device of claim 43 including a clamping circuit provided on each input line for clamping input voltages, said clamping circuit including back to back diodes.

45. The device of claim 44 further including small value surge resistors on each of the input lines.

46. The device of claim 45 including an analog to digital inhibit input wherein signals from the analog to digital conversion circuit are prevented from interfering with any pulse width signal presented to the device from outside the device.

47. The device of claim 46 wherein said digital input and output registers comprise low powered Schottkey TTL integrated circuits.

48. The device of claim 47 wherein said eight output lines are conventional totem pole outputs.

49. The device of claim 48 wherein said eight input lines are conventional multiple emitter input circuits.

50. The device of claim 49 wherein only one input buffer is enabled at a time so data does not conflict therein.

51. The device of claim 50 wherein both input buffers are disabled during the outputting of digital data.

52. The device of claim 51 wherein said registers are set with an overall duty cycle and repetition rate for the pulse width modulated output being controlled.

53. The device of claim 52 wherein a square wave is produced by such control and then filtered to produce a DC voltage linearly proportional to a duty cycle of the pulse width modulated output.

54. The device of claim 53 wherein the range of counted external events is unlimited.

55. The device of claim 54 including a counter register which counts any number of pulses to approximately 65,000 at which time an interrupt is generated by the counter register to keep a tally of counter overflows.

56. The device of claim 55 wherein said device can both read data and send data over a single bidirectional data line.

57. The device of claim 56 including structure which will allow key strokes to pass from said keyboard to the CPU of the computer and will allow instructions from the CPU of the computer to be sent through the device back to the keyboard.

58. The device of claim 57 wherein such structure comprises a bidirectional data line.

59. The device of claim 58 including means for connecting several inputs of the analog multiplexer to an analog to digital conversion circuit for measuring the voltage on each input, converting the voltage to a pulse width, converting each pulse width to a decimal ASCII string, converting each string into a series of key codes and sending such key codes to the central processor of the computer, with each measurement being followed by a field delimiter, and with a complete sequence of measurements being followed by a record delimiter.

60. The device of claim 56 including a window comparator.

61. The device of claim 60 including an inverter between the output of the window comparator and the input signal line to the single chip microprocessor.

62. The device of claim 61 including an analog to digital inhibit feature which disables the inverter so that external signals which are positive can be supplied directly to the microprocessor on the line where the typically inverted pulse width coming out of the window comparator is transported.

63. A method of using a device comprising signal receiving means for receiving electrical signals from outboard devices communicating therewith, a microprocessor having an input thereof connected to an output of said signal receiving means, the microprocessor translating said received signals into computer oriented alphabetical, numerical and control keyboard code signals accepted by a central processor of a computer, and signal output means connected to an output of said microprocessor for sending the translated code signals to the central processor of the computer; said method including the steps of:
receiving an electrical signal;
performing an algorithm to provide a number of equivalent millivolts for said signal; and
producing a binary value establishing an exact number of millivolts, said signal being converted through algorithms to a decimal value which is in turn converted to a text string to be transmitted to the central processor of the computer.

64. The method of claim 63 further including the steps of reading a pulse width of pulses present on an input line, sensing a complete pulse, measuring its width and calculating the related input voltage, the input voltage being converted to ASCII test in a scratch pad memory of the microprocessor.

65. The method of claim 64 wherein said ASCII text is then converted to key codes appropriate for a program with which the device is being utilized.

66. The method of claim 65 including timer registers which are within the microprocessor, one timer register for storing the number of microseconds for which an output is high and the other register for storing the number of microseconds for which the output is low.

67. The method of claim 66 further including the step of attenuating said signal and connecting said signal to an input selector.

68. A device for use in acquiring and transmitting data to a central processor of a computer and using a response to same generated by said central processor for controlling an outboard peripheral apparatus using a keyboard interface of said computer, without need of a computer keyboard, said device including:
signal receiving means for receiving signals indicative of any alphabetical, numerical, and control input;
a microprocessor having an input thereof connected to an output of said signal receiving means, said microprocessor being programmed to translate said received signals into computer oriented keyboard code signals accepted by a central processor of the computer;
signal output means connected to an output of said microprocessor for sending the translated code signals to the central processor of the computer; said signal receiving means and said signal output means comprising a bidirectional data line; and
means for receiving signals from said central processor of said computer and translating said signals into usable code for controlling peripheral devices communicating therewith in response to said received signals.

69. The device of claim 68 including a programmable asymmetrical pulse width output.

70. The device of claim 69 including a system for translating incoming signals into ASCII characters.

71. The device of claim 70 including a plurality of output registers for controlling devices attached thereto.

72. A peripheral data acquisition, transmission and control device connected to a keyboard interface of a computer said device comprising:
signal receiving means for receiving signals indicative of any alphabetical, numerical and control input;
a microprocessor having an input thereof connected to an output of said signal receiving means, said microprocessor translating said received signals into computer oriented keyboard code signals accepted by a central processor of the computer;
signal output means connected to an output of said microprocessor for sending the translated code signals to the central processor of the computer;
means for allowing communication between a keyboard and said computer via said device; and
means for allowing communication between said computer and outboard peripheral devices electrically coupled to outputs of said device.

* * * * *